United States Patent
McKinley et al.

(10) Patent No.: US 10,163,173 B1
(45) Date of Patent: Dec. 25, 2018

(54) METHODS FOR GENERATING A COVER PHOTO WITH USER PROVIDED PICTURES

(71) Applicant: Google LLC, Mountain View, CA (US)

(72) Inventors: Sara McKinley, Mountain View, CA (US); Brandon Wade Oxendine, Mountian View, CA (US); Karthik Murili Nagaraj, Mountain View, CA (US); Evan Gilbert, Mountain View, CA (US); Christopher Reaves Messina, Mountain View, CA (US)

(73) Assignee: Google LLC, Mountain View, CA (US)

( * ) Notice: Subject to any disclaimer, the term of this patent is extended or adjusted under 35 U.S.C. 154(b) by 163 days.

(21) Appl. No.: 14/198,440

(22) Filed: Mar. 5, 2014

Related U.S. Application Data

(60) Provisional application No. 61/773,776, filed on Mar. 6, 2013.

(51) Int. Cl.
*G06Q 50/00* (2012.01)
*G06F 3/0484* (2013.01)

(52) U.S. Cl.
CPC ......... *G06Q 50/01* (2013.01); *G06F 3/04842* (2013.01)

(58) Field of Classification Search
CPC ..... G06F 3/0481; G06F 3/0482; G06F 9/4443
See application file for complete search history.

(56) References Cited

U.S. PATENT DOCUMENTS

| | | | | |
|---|---|---|---|---|
| 2006/0026528 A1* | 2/2006 | Paulsen | ............... | G11B 27/034 715/776 |
| 2007/0019924 A1* | 1/2007 | Teo | ................... | H04N 1/00132 386/278 |
| 2007/0058932 A1* | 3/2007 | Wafler | ................... | G11B 27/34 386/241 |
| 2010/0223568 A1* | 9/2010 | Quek | ...................... | G06T 11/60 715/765 |
| 2013/0030987 A1* | 1/2013 | Zuckerberg | ............ | G06Q 20/12 705/39 |
| 2013/0073972 A1* | 3/2013 | Yung | ...................... | G06Q 50/01 715/738 |
| 2013/0151987 A1* | 6/2013 | Flynn | .................... | G06F 3/0488 715/753 |
| 2014/0089816 A1* | 3/2014 | DiPersia | ............... | G06F 3/0484 715/753 |

OTHER PUBLICATIONS

Shutterfly, How to create a collage poster, Jul. 2, 2008, 8 pages.*

* cited by examiner

*Primary Examiner* — Kevin L Young
*Assistant Examiner* — Parmanand D Patel

(57) ABSTRACT

A method for generating a cover photo for presenting on a profile page includes receiving a request from a user to generate a cover photo for presenting on a profile page of the user account. A user interface identifying a plurality of slots for inserting the pictures/assets selected by the user, is presented at the profile page in response to the request. User selection of pictures/assets for placement in the plurality of slots at the user interface, is received. The pictures/assets are examined for assembling the selected picture/asset into a mosaic. The examination determines open slots that are available for inserting the pictures/assets and a sequence of insertion of the pictures/assets into each of the open slots in the user interface. A unified cover photo is generated by stitching together the one or more pictures/assets selected by the user based on sequence of insertion obtained through examination.

23 Claims, 22 Drawing Sheets

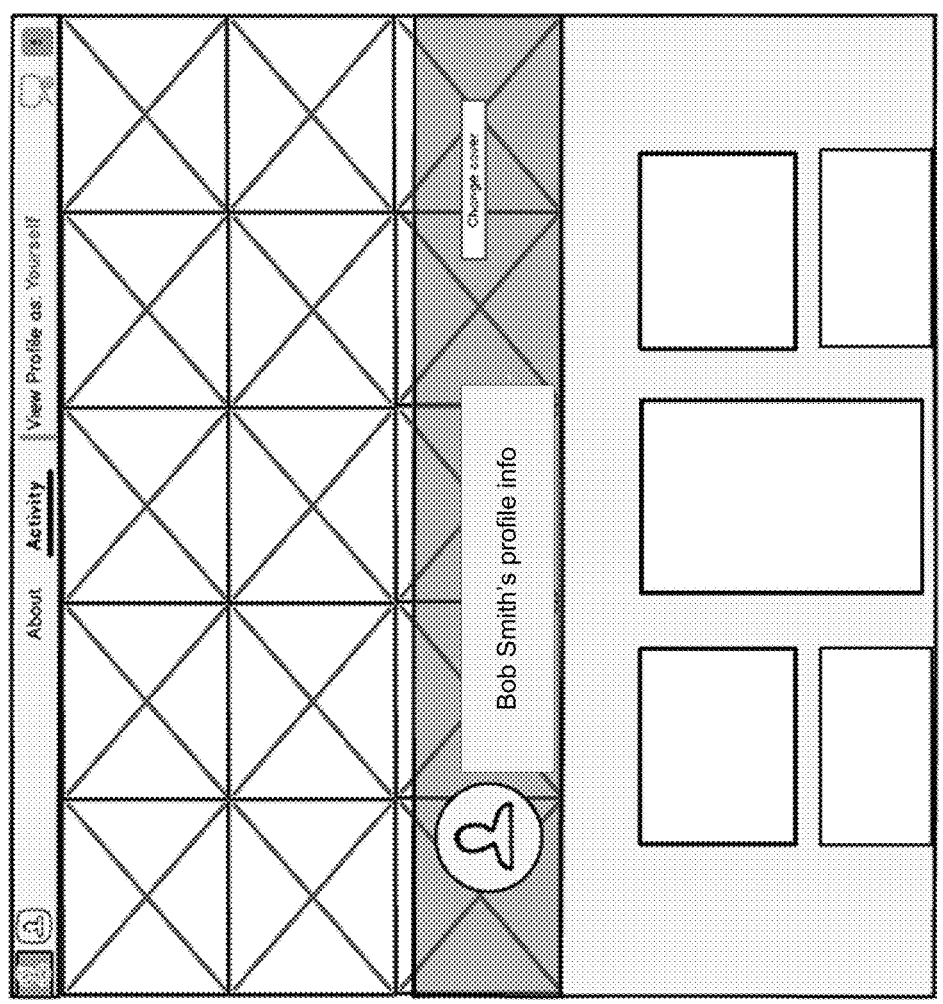

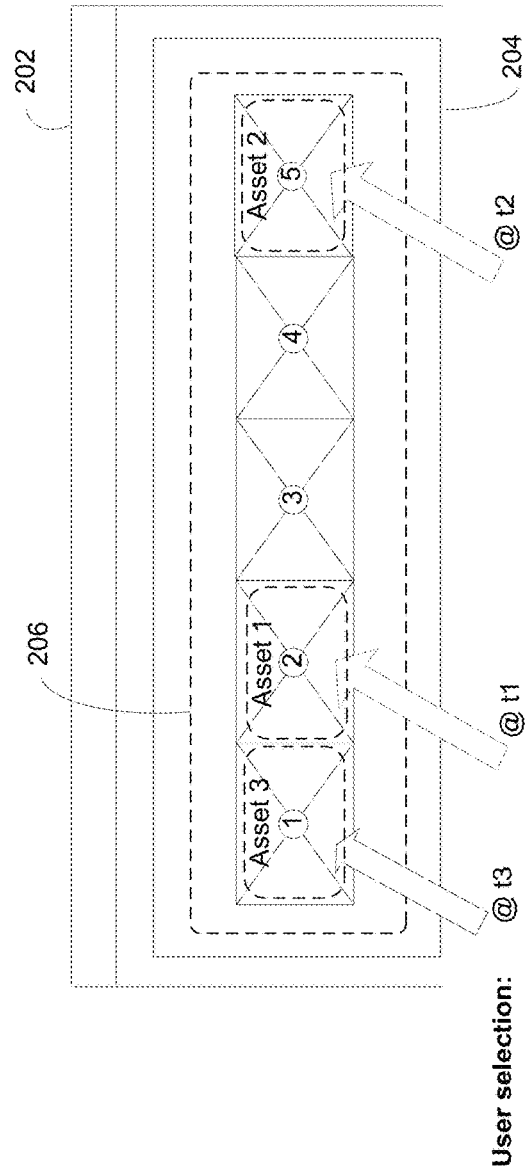

METHODS FOR GENERATING A COVER PHOTO WITH USER PROVIDED PICTURES

CLAIM OF PRIORITY

This application claims the benefit of and priority, under 35 U.S.C. § 119 (e), to U.S. Provisional Patent Application No. 61/773,776, filed on Mar. 6, 2013, and titled "Methods for Generating a Cover Photo with User Provided Pictures", which is hereby incorporated by reference in its entirety.

BACKGROUND

The present disclosure relates to methods and computer programs for generating cover photo from a set of profile pictures or assets provided by or to a user and enabling the users to customize the cover photo.

In recent years, social networks have gained in popularity amongst internet users. Social networks enable users to hold representative accounts, and establish connections to other account holders, which may include friends, family members, business acquaintances, or information sources on the same social network. When a user accesses his/her account, the user is presented with a landing page, such as a profile page. The profile page enables the user to provide information, such as user's social identifier, a profile picture, social contact information of the user and a user interface to receive, post, and interact with social feeds/posts/information from or to his/her social connections.

Due to ubiquitous nature of the social networks, it is desirable for the user to be able to present a profile page with information that is more representative of the user. The current profile page provides very little options for customization. For instance, the user is able to select a single picture or profile image to present on the profile page. The user may have multiple profile images or pictures or assets that the user may be interested in presenting in his/her profile image. However, the user is unable to share multiple pictures/assets as the current profile page does not provide the option of sharing multiple profile images or assets on the profile page.

SUMMARY

Embodiments of the present disclosure provide methods, systems, and computer programs for generating a cover photo with user provided profile pictures/assets and/or pictures/assets provided by other users that have a social relationship with the user. It should be appreciated that the present disclosure can be implemented in numerous ways, e.g., a process, an apparatus, a system, a device or a method on a computer readable medium. Several embodiments of the present disclosure are described below.

In one embodiment, a method for generating a customizable cover photo for presenting on a profile page, is disclosed. The method includes the following method operations: receiving a request from a user to generate a customized cover photo for presenting on a profile page of the user; presenting a user interface at the profile page in response to the request, the user interface identifying a plurality of slots for inserting the pictures/assets selected by the user; receiving user selection of pictures/assets for placing in the plurality of slots at the user interface; examining the pictures/assets for assembling the picture/asset into a mosaic, the examination determining availability of open slots for inserting the pictures/assets and sequence of insertion of the pictures/assets into each of the plurality of slots in the user interface; and generating a unified cover photo by stitching together the one or more pictures/assets selected by the user based on sequence of insertion obtained through examination.

In one embodiment, the user interface provides a plurality of templates for user selection, wherein each template includes plurality of slots for inserting the pictures/assets, each slot within each template associated with specific dimensions, the plurality of slots in each template presented in a specific order based on the dimensions.

In one embodiment, the template may include slots of varying dimensions and shapes.

In one embodiment, each of the plurality of slots may be associated with predefined rules, wherein the predefined rules define sequence of insertion of a picture or asset for each slot.

In one embodiment, the predefined rules are based on content contained within the pictures/assets that are selected for insertion.

In one embodiment, each of the plurality of slots is associated with a user activity detector, the user activity detector identifying selection of a specific slot for insertion of the selected picture/asset.

In one embodiment, examining the pictures/assets includes examining contents contained therein and identifying a slot within the user interface for inserting the picture/asset.

In one embodiment, examining the selected pictures/assets include examining dimensions of the slot into which the selected pictures/assets are to be inserted and resizing the selected pictures/assets to adjust to the dimensions of the slots.

In one embodiment, generating the cover photo includes integrating the selected pictures/assets in a sequence defined by the predefined rules to generate a unified cover photo.

In one embodiment, generating the cover photo includes integrating the selected pictures/assets to generate a unified cover photo, the integration based on a sequence established by the user.

In one embodiment, wherein generating the cover photo includes adjusting rendering portion of the cover photo to be responsive to a display area available in a profile card of a profile page.

In accordance with another embodiments, a method for customizing cover photo for presenting on a profile page, is disclosed. The method includes the following method operations: authenticating a user to an account on a social network; rendering a profile page with the cover photo on a social display device associated with a user; receiving user activity at one or more pictures/assets for customizing in the cover photo, wherein the customizing of the pictures/assets include one or more of replacing, adding, deleting, resizing, reordering of the pictures/assets within the cover photo; and generating a customized cover photo based on the user activity at the cover photo, the customized cover photo replacing the cover photo in the profile page.

In one embodiment, wherein the customizing further includes the method operation of examining the pictures/assets within the customized cover photo and adjusting the display portion of the customized cover photo to be responsive to a display area of the profile page.

In one embodiment, wherein the reordering of the pictures/assets in the customized cover photo is based on predefined rules, the predefined rules identifying sequence for integrating the pictures/assets in the cover photo resulting from customizing of the cover photo.

In one embodiment, the predefined rules are based on content within the pictures/assets included in the customized cover photo.

In one embodiment, the profile page is a social network page associated with the user.

Other aspects will become apparent from the following detailed description, taken in conjunction with the accompanying drawings.

BRIEF DESCRIPTION OF THE DRAWINGS

The disclosure may best be understood by reference to the following description taken in conjunction with the accompanying drawings.

FIGS. 4a-4e illustrate exemplary mock screen shots depicting the process flow sequence of generating a cover photo using photo mosaic layout option in the user interface, in one embodiment of the invention.

FIGS. 6a-6g illustrate exemplary mock screen shots and block diagrams depicting the process flow sequence of generating a cover photo using a photo mosaic layout with manual selection option, in one embodiment of the invention.

FIGS. 8a, 8b, 8c-1 and 8c-2 illustrate exemplary cover photo renderings that are responsive to display area of a profile card in a profile page, in accordance with an embodiment of the invention.

DETAILED DESCRIPTION

The following embodiments describe methods, computer programs, and systems for generating a cover photo for presenting on a profile page of a user within a social network that is accessed when a user signs into a user account. The cover photo includes a combination of user provided photos, pictures and/or assets. In addition to user provided photos/pictures/assets, the cover photo may also include additional photos, pictures and/or other assets provided or shared by other users/entities that have social relationship with the user, by third party entities from within or outside of a user account of a social network, or obtained from the internet. The cover photo for the profile page is generated by stitching together the photos, pictures, and other assets selected by the user and presented as an unified cover photo. In one embodiment, the stitching may include overlapping, cropping, blending, joining, re-sizing and joining, re-sizing and overlapping, re-sizing and blending, re-sizing and cropping, or any combinations thereof. The blending may be along one or more edges where the stitch may be formed. In some embodiments, the blending may have blending gradient, or may include progressive blending, or any other degrees or forms of blending to generate a unified cover photo. The unified cover photo generated by the user may be further customized by allowing the user to re-arrange, replace, remove and/or add one or more pictures/assets to the unified cover photo. The customization may be performed periodically to update the user's profile on the front page (i.e., profile page) of the social network.

In some embodiments, additional customization options may include resizing selective ones of the photos/assets that are identified for inclusion in the cover photo. The resizing may be performed by the user or may be performed by a logic of an application used in generating the cover photo. In some embodiments, the photos/assets (including videos) within the unified cover photo may be organized in a single array. In other embodiments, the photos/assets may be presented in a plurality of rows and columns or arranged haphazardly in a collage format. The unified cover photo may be presented as the user's profile within the social network's front or landing page. In addition to generating a cover photo that is customizable, the various embodiments also provide the option to overlay user's profile data. The profile data may include text, icons, images, such as user's picture, or other images representative of or desired by the user. Details of generating and customizing the cover photo within a profile page will be described below.

Figure 1:
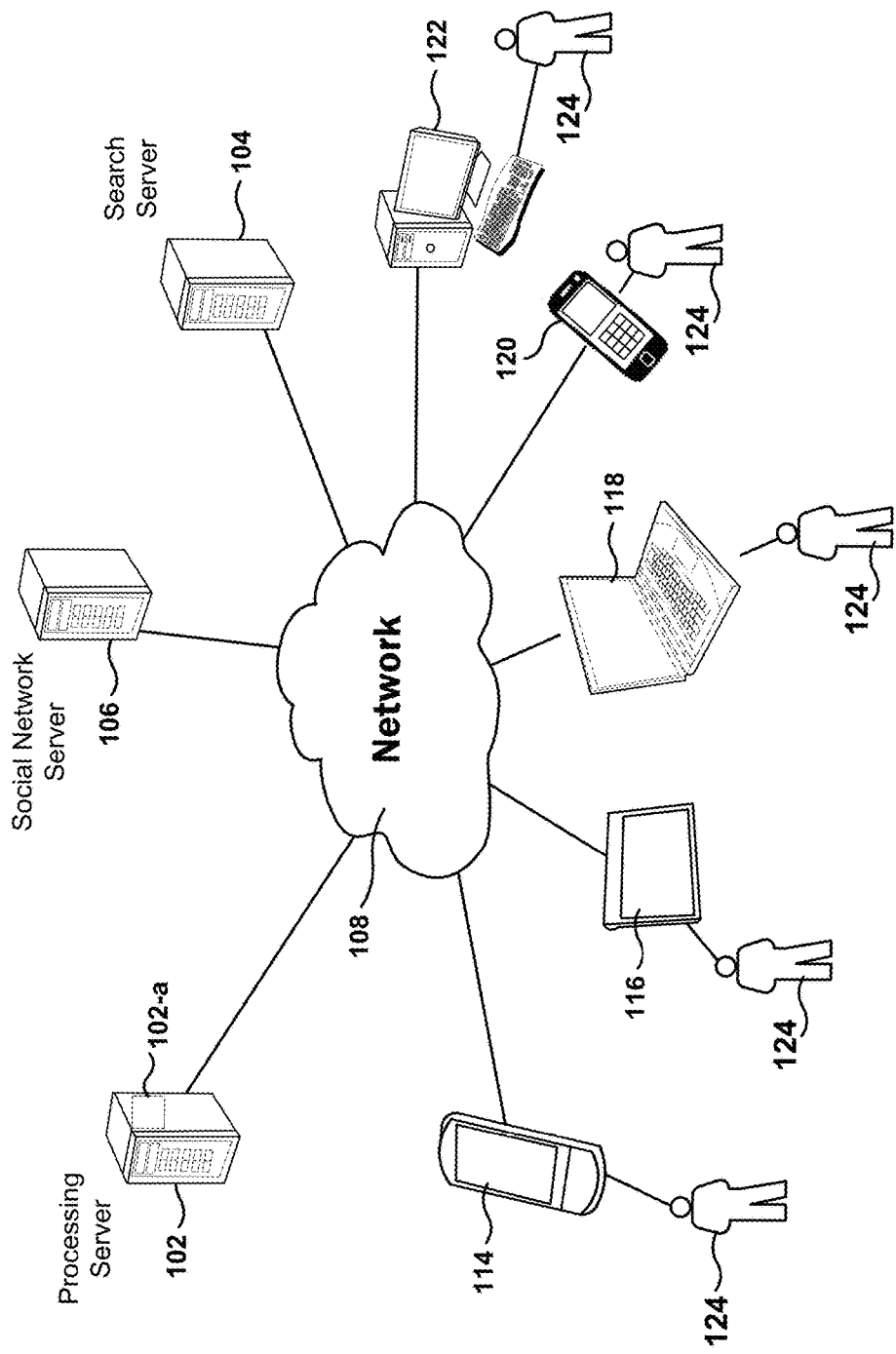
FIG. 1 illustrates an example architecture of a system for implementing embodiments of the disclosure, in accordance with embodiments of the present disclosure.

FIG. 1 provides one example architecture of a system that may implement embodiments described herein. Users 124 interact with each other in the context of a social network, where users can include real people and entities. Each user has an account in the social network, and the account includes at least a user name or a user identifier. The account can be accessed through authentication provided on a user authentication interface. The user authentication interface is configured to request and receive user authentication information, verify the authentication information and provide access to social media stream of the social network that is associated with the user account, upon successful verification. The social media stream is presented to the user in a profile page (illustrated by reference numeral 202 in FIGS. 2a-2d), which serves as a landing page for the user in the social network. In addition to presenting the social media stream, the profile page includes a profile of the user with additional information about the user, e.g., birth date, residence, favorite activities, etc. A profile card (represented by reference numeral 204 in FIGS. 2a-2d) within the profile page may be used to present some or all of the profile information of the user including a preferred profile image of the user. The profile card identifies a portion of the profile page that is used for presenting user related information, including profile information, profile picture/photo, etc. The user is in control of what information is added to the profile, and what information is shared with others. A user may access the social network through different devices, e.g., a smart phone 114, a tablet computer 116, a laptop 118, a mobile phone 120, a personal computer 122, or any computing device that provides access to the Internet. Of course, the illustrated devices are only examples and any other type of computing device may be used to access the social network.

In accordance with some embodiments, social network server 106 delivers social media services that enable users to interface and exchange information with each other. The social network server provides a website that enables users to define user accounts. The user accounts can be individual accounts for people or entity accounts. Through these accounts, users are able to connect with their friends, group of friends, entities, groups of entities, etc. In some embodiments, the relationships established in the social network may be utilized in other contexts. Processing server 102 can be configured to perform various additional functions related to the social network, e.g., executing applications, which run within the social networking environment, or processing data relating to external sites which have integrated social functionality. Search server 104 provides Internet search capabilities.

In one embodiment, one of the applications executing on the processing server 102 is a cover photo generation application 102-*a* that is configured to generate a cover photo using the pictures, images, textual content, icons, graphic images (both static and animated images), videos, and other assets identified by the user. The logic within the cover photo generation application 102-*a* is configured to receive layout template selection, pictures, videos, graphic images, and/or other assets, examine the pictures/assets and generate the cover photo by integrating the pictures/assets identified by the user and presenting the cover photo on a profile card within the profile page. Although the embodiments described herein describe generation of a unified cover photo, it should be understood that the cover photo is not just used to integrate different pictures/photos together but could be extended to integrating other form of media assets. As a result, the cover photo may sometimes be referred to as cover media, wherein the media to generate the cover media may include a photo, multiple photos, videos, videos/photos, audio, audio/video, audio/video/photo, other artwork, photospheres, media that is stitched together or provided as individual units, etc. In some embodiments, the logic within the cover photo generation application 102-*a* may automatically select the pictures/assets and generate the cover photo based on the layout template selection. In these embodiments, the logic of the photo generation application may examine the attributes of the selected assets, determine the attributes defined for each slot within a selected layout template and determine placement of the selected assets into respective slots during generation of the cover photo. In some other embodiments, the photo generation application may provide one or more layout templates with a plurality of icons/slots acting as placement holders for inserting the picture/asset and allow a user to select the layout template for the cover photo. The insertion of the pictures/assets may be through user interactions at the appropriate slots of the selected layout template. In the aforementioned embodiments, automatic or manual placement of the selected assets/pictures may be determined from placement options provided at the template. The inserted pictures/assets are stitched together to generate a unified cover photo.

It is noted that the embodiments illustrated in FIG. 1 are exemplary. Other embodiments may utilize different servers, have the functionality of one server distributed over a plurality of servers, have the functionality of two or more servers combined into a single server, have a different amount of user categories in the social network, categorize users by different criteria, etc. The embodiments illustrated in FIG. 1 should therefore not be interpreted to be exclusive or limiting, but rather exemplary or illustrative.

Figure 1A:
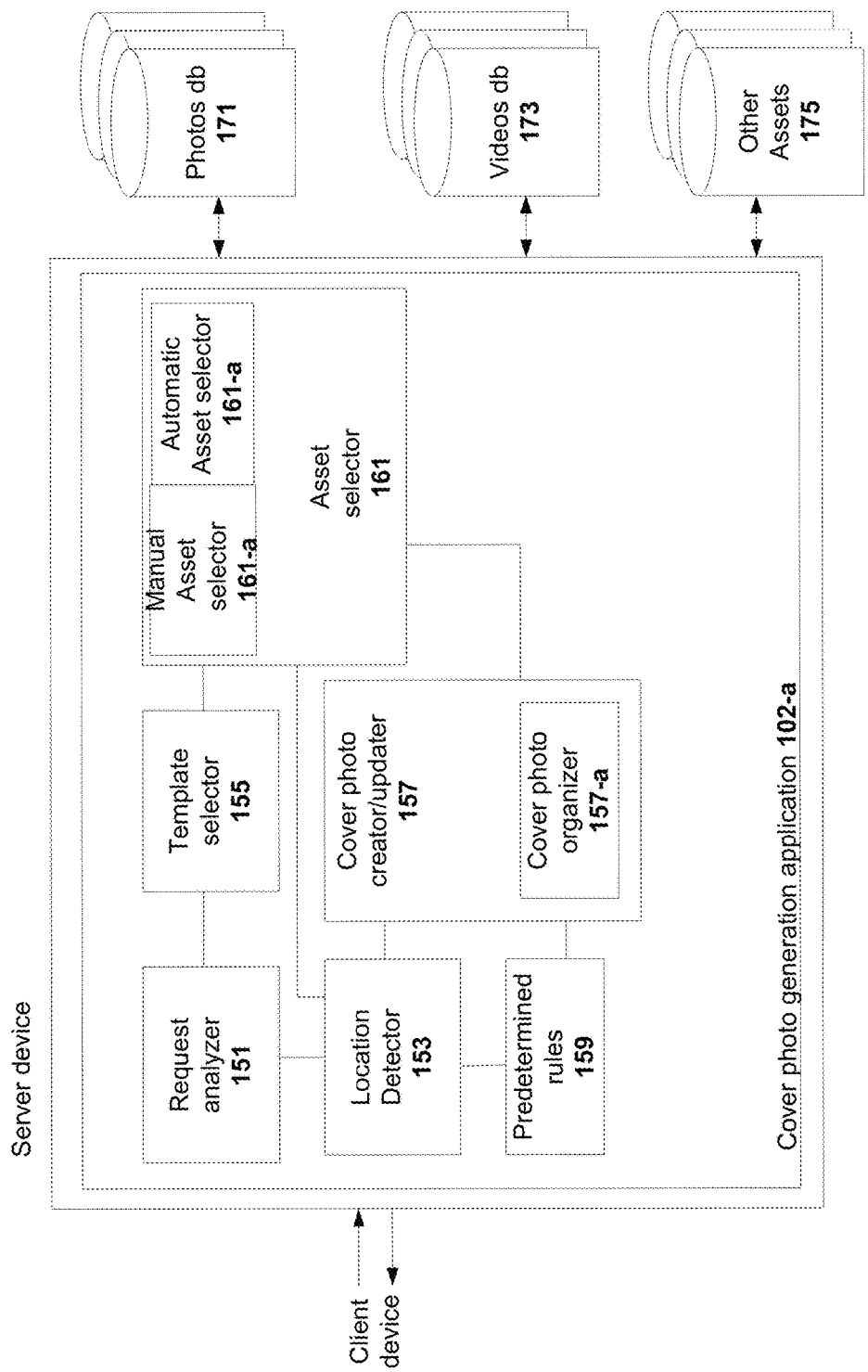
FIG. 1a illustrates the various modules within a cover photo generation application that is used for generating the cover photo, in accordance with one embodiment of the invention.

Various contextual examples illustrating implementations of different embodiments of the invention are contemplated. FIG. 1*a* illustrates the various modules within the cover photo generation application 102-*a* used in generating the cover photo, in one embodiment of the invention. The various modules include logic that is configured to perform the various functionalities involved in the generation of the cover photo. Some of the exemplary modules within the cover photo generation application 102-*a* includes a request analyzer module 151, a template selector module 155, a location detector module 153, a cover photo creator/updater module 157 and an asset selector module 161. In addition to the aforementioned modules, the cover photo generation application 102-*a* may also include a set of predefined rules that may be engaged during the placement of the selected pictures/assets and during the generation of the cover photo. The cover photo generation application 102-*a* may generate the cover photo by automatically determining the slots within a selected template for inserting the selected assets or may use the user selection of specific ones of the slots for inserting the selected assets. The automatic or user selection of placement of the assets may be determined by selection options chosen at the template, in one embodiment.

The request analyzer module 151 includes logic that is configured to receive a user request for generating a new cover photo or change an existing cover photo. The request analyzer module 151 may analyze the request to determine the user identification information and, in some embodiments, may generate a query to determine if the user wants to generate a new cover photo or update an existing cover photo. When the user desires to update an existing cover photo, the existing cover photo may be rendered in the profile page for updating. When the user desires to generate a new cover photo, the request analyzer module 151 may forward the request to the template selector module 155 for processing the request.

The template selector module 155 includes logic that is configured to receive the request and, in response, identify one or more templates and present the templates on a user interface for user selection. Each of the templates includes one or more slots that act as place holder for inserting the pictures or assets selected by the user. Each of the slots in the template may be associated with attributes, such as dimensional attributes, placement attributes, content related attributes that define which type and format of content that may be rendered therein. In addition to the attributes, each slot includes a user activity detector to detect selection of the slot by the user. User selection of the template is received at the template selector module 155 and, in response to the user selection, present the selected template in a user interface at the profile page to allow the user to generate a cover photo.

The user may select pictures/assets to place in different slots of the selected template. The asset selector module 161 includes logic to provide a user interface with options for choosing manual selection of the pictures/assets or automatic selection of the pictures/assets for placement in the different slots. When the user selects a manual selection option, the manual asset selector module 161-*a* within the asset selector module 161 is activated. The manual asset selector module 161-*a* is configured to identify and present the pictures/assets associated with the user on a user interface to enable the user to select pictures and/or assets to place in the various slots within the template. In one embodiment, the manual asset selector module 161-*a* may identify a plurality of pictures that are available within the profile page and present them in a user interface. In an alternate embodiment, the manual asset selector module 161-*a* includes logic that is configured to allow the user to manually download pictures and/or assets from different entities/sources. The downloaded assets may be generated by the user, generated by other users for the user, provided by different entities/sources, etc.

If the automatic selection option is chosen by the user, the automatic asset selector module 161-*b* within the asset selector module 161 is triggered. The automatic asset selector module 161-*b* is configured to identify and select the pictures/assets for the user. In one embodiment, the asset selector module 161-*b* may present a user interface with various asset selection options that may be used to identify the pictures/assets for placing in the selected template. For example, some of the selection options may include most popular pictures/assets, most recent pictures/assets, pictures/assets specific to an event, pictures/assets of a particular theme, pictures/assets for specific time period, assets of a particular type, etc. The asset selection options are exemplary and additional selection options may be provided, such as most preferred assets options of the user, most preferred assets options within the social group of the user, etc. Based on the asset selection option chosen by the user, the asset selector module 161 is configured to interact with various assets databases, to identify and retrieve the appropriate pictures/assets for placement in the different slots of the template. In one embodiment, the assets databases may be organized by asset types. For example, the assets databases may include a photo assets database 171 that store pictures, a video assets database 173 that store videos, a database for storing textual content (175), a database for storing audio content (175), a database for storing graphical images (175), etc.

User selection at the asset selector module is transmitted to the location detector 153 for examination and placement in the template. The location detector 153 includes logic that is configured to receive the assets/pictures selected by the user (for e.g., when manual selection option is selected) or by the system (for e.g., when automatic selection option is selected), examine the picture/asset to determine location and placement of the selected picture/asset within the selected template. The location detector module 153 includes logic that is configured to interact with the predefined rules module 159 to obtain the predefined rules and use the predefined rules to determine the location and placement of the selected pictures/assets. The predefined rules may specify the location and placement of the pictures/assets based on the insertion sequence, in one embodiment. Using the information provided in the predefined rules, the location detector 153 may insert the selected pictures/assets into the specific slots in the selected template.

The cover photo creator/updater module 157 includes logic that is configured to interact with the location detector module 153 to determine the location and placement of the selected pictures/assets within the template. A cover photo organizer 157-*a* within the cover photo creator/update module 157 is configured to verify the information related to the location and placement of the pictures/assets from the location detector and use this information to stitch the pictures together to generate a unified cover photo. In one embodiment, the verification may include determining if the attributes of a picture/asset match the attributes of the slot selected for placing the picture/asset. When the attributes of the picture/asset match the attributes of the slot, the picture/asset may be inserted into the slot. When the attributes (for e.g., dimensional attributes) of the picture/asset do not match the attributes of the slot, the cover photo organizer 157-*a* may re-size the picture/asset to fit the attributes of the slot before inserting the picture into the slot. Alternately, the cover photo organizer 157-*a* may render an informational message indicating a mis-match in the attributes and generating a request to select a different asset/picture for the slot.

Upon successful verification, the cover photo organizer 157-*a* stitches together the pictures/assets inserted in the different slots of the template, based on sequence provided by the location detector module and verified against the predefined rules. The unified cover photo generated by the cover photo organizer reflects the sequence and placement of the selected pictures/assets desired by the user. The unified cover photo may be returned to render at a profile card in the profile page. The cover photo generated may be further customized from time to time by selectively adding, removing, replacing, resizing and/or reorganizing selective ones of the photos within the generated cover photo based on subsequent user action.

Once the cover photo is generated with the selected pictures/assets, the cover photo creator module 157 may identify and overlay profile data of the user. The profile data of the user may include text, icons, images, pictures, etc., and may be overlaid anywhere on the cover photo. The logic within the cover photo generation application is configured to detect user activities, select pictures/assets, examine the pictures/assets to determine placement and location and integrate the pictures/assets in a sequence determined by predefined rules or defined by a user to present a unified cover photo to the user in the user's profile page.

Figure 2A:
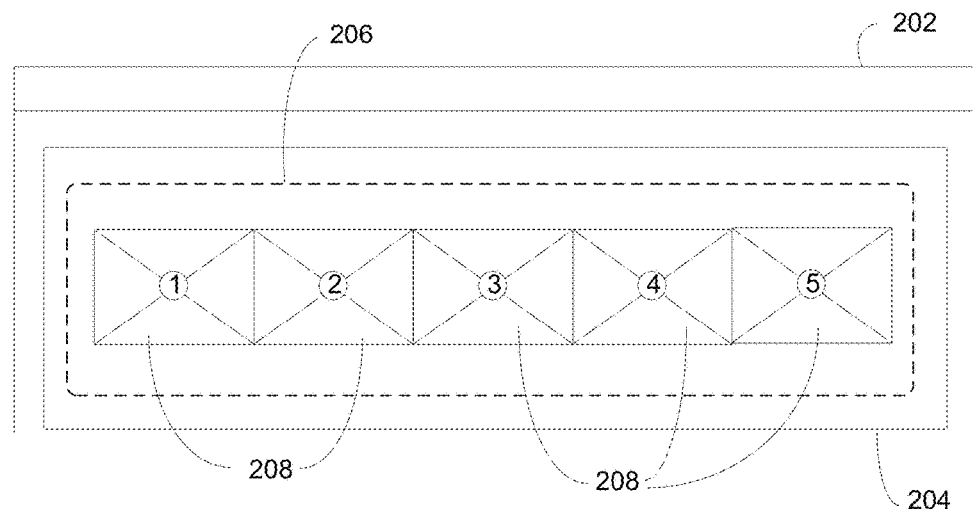
FIGS. 2a-2d illustrate exemplary layout templates that can be used for generating a cover photo within a profile page, in accordance with different embodiments of the invention.
Figure 2B:
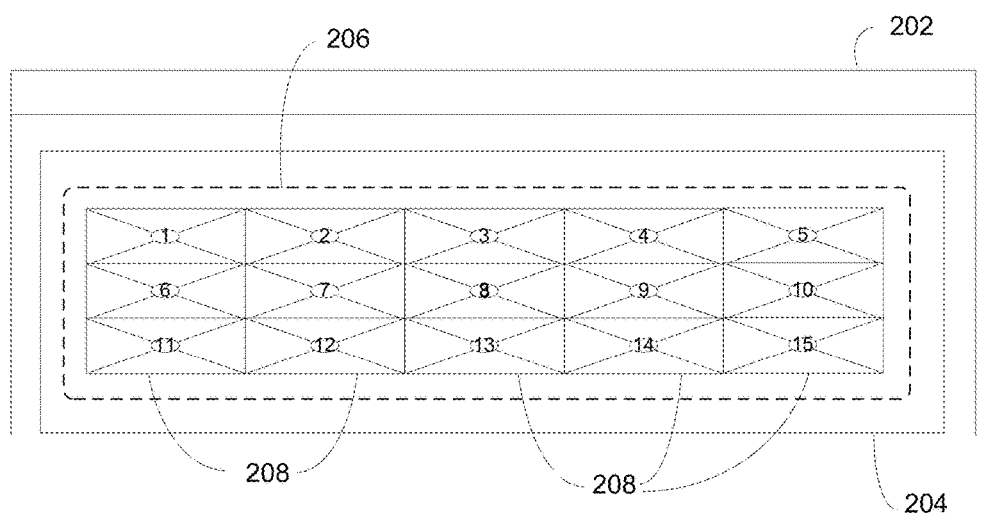

As mentioned earlier, in one embodiment, in response to the request, the photo generation application 102-*a* may identify layout templates that can be used to organize the pictures/assets and present the layout templates for user selection on a user interface within the profile page. FIGS. 2*a*-2*d* illustrate exemplary layout templates that can be used in generating the cover photo. FIG. 2*a* illustrates an exemplary layout template provided by the photo generation application 102-*a* in the form of a single array having a plurality of slots into which the user selected pictures and/or assets are placed, wherein the slots have the same dimensional attributes. The dimensional attributes of a slot, as mentioned earlier, include attributes defining a size and attributes defining a shape. In the exemplary template illustrated in FIG. 2*a*, the size and shape attributes of the cells in the template are the same. The template may be presented in a cover photo user interface 206 within a profile card 204 in the profile page 202. FIG. 2*b* illustrates an alternate layout template (or simply a template) provided by the photo generation application 102-*a*. The alternate layout template is in the form of a grid having a plurality of cells, wherein each cell in the grid represents a slot for placing a picture and/or asset. In this template, the dimensional attributes (both shape and size related attributes) of each cell (representing a slot) is the same. In another exemplary layout template illustrated in FIG. 2*c*, the template may include different sized tiles, representing slots, with each tile representing a photo or asset placement area. In this template, the dimensional attributes (for e.g., size attributes) of some of the cells are different while the shape attributes are same. In one embodiment, the different sized tiles may be arranged randomly. In another embodiment, the different sized tiles may be arranged in a specific order. In some embodiments, the template may be initially presented in a specific order and the logic may provide the user with option to dynamically adjust the order of the tiles to user's taste. In another embodiment illustrated in FIG. 2d, the template may be a mosaic with random shapes or bubbles for tiles/slots with each random shape/bubble representing a photo or asset placement holding area.

The user may identify a single picture, a plurality of pictures, a combination of pictures, videos, or other assets of the user or generated by the user for presenting in the cover photo based on the layout template selected by the user. As mentioned before, the user selection of pictures/assets for cover photo generation is not restricted to using user generated photos/assets. Rather, the user may also identify pictures, videos or assets generated/provided by other users or business entities that have a social relationship with the user within one or more social networks, for inclusion in the cover photo. In some other embodiments, the user may also identify pictures, videos or assets available on the Internet or may include videos/images/pictures provided by an entity, such as an advertisement entity, to include in the cover photo. In this embodiment, the user may agree to place the asset provided by the advertisement entity in the cover photo in return for a monetary/non-monetary compensation.

Irrespective of the source of the pictures/images/videos/assets, the cover photo generation application generates the cover photo for the profile page of the user using the one or more pictures identified by the user. In one embodiment, the cover photo generation application uses the template selected by a user for generating the cover photo. In another embodiment, the cover photo generation application may automatically select a template based on the number and/or type of pictures/assets selected by the user for rendering on the cover photo.

The cover photo generation application, in one embodiments, will examine the selected pictures, videos and/or other assets identified by the user to determine location and placement of the pictures/assets in the cover photo based on the selected template, and assign the pictures/assets to appropriate slots in the selected template based on the examination. The examination may include determining the attributes of each selected picture/asset, including placement attributes, dimensional attributes and/or context related attributes, determining attributes associated with each slot in the selected template to determine a match of the attributes in order to place the corresponding picture/asset in the appropriate slot. In some embodiments, the placement attribute defined for the asset may identify a desired location, such as center slot, first slot, last slot, etc., within the template preferred for rendering the asset. In some embodiments, placement attribute for an asset may be explicitly defined by user action at a particular slot in the template. A user action detector defined for each slot in each template may be used by the cover photo generation application to detect user action at a particular slot. Although some of the embodiments are depicted/described with reference to placement of a single media type of assets, such as pictures/photos, the logic of the application can be extended to include other assets, such as music, a poll or contest, an offer, videos, graphic animations, photospheres, a user interface with an ability to buy a ticket, a marketing interface for buying or selling goods/services, a promotional media interface for rendering promotional content, or any other media/asset that can be rendered, in the cover photo.

In one embodiment, the application may determine the location of the slot within the selected template into which the selected assets are to be inserted, based on sequence of insertion of the assets within the selected template, which can be bound by predefined rules. In this embodiment, the application may perform automatic placement of selected asset within a template using the sequence defined by the predefined rules. Based on the examination, the cover photo generation application will insert the asset into specific locations and stitch the pictures/asserts in the template to generate a unified cover photo. Based on the number of pictures/assets inserted, the dimensions of the unified cover photo may be adjusted to be responsive to the display area of the profile card. The cover photo may also allow overlay of profile data of the user. The profile data may include text, icons, image and other information that the user wishes to include in the overlay. The cover photo with the overlaid profile data of the user representing user's profile is returned for rendering on a profile page of the user.

FIGS. 3-6 illustrate exemplary mock screen shots depicting process flow sequence for generating a cover photo using various options provided by the cover photo generation application in the user interface. FIGS. 3a-3d illustrate exemplary mock screen shots depicting process flow sequence for generating a cover photo using photo canvas layout. The cover photo generation application provides a user with an option to change an existing cover photo or generate a new cover photo for rendering on a profile card within a profile page, as illustrated in FIG. 3a. When the user selects to generate or change a cover photo, a layout selection mechanism is triggered. In one embodiment, the layout selection mechanism presents a user interface with an option to select from a plurality of layout templates. Some exemplary layout templates presented for selection include a photo canvas layout, a photo mosaic layout or a video canvas layout, as illustrated in FIG. 3b.

In addition to the various layout options, the layout selection mechanism may also provide device selection options for which the cover photo is being generated or from which the request to change cover photo is received. Some exemplary device options include a desktop computing device, a tablet computing device or a mobile device. The layout presented in FIG. 3b and device selection options disclosed herein are exemplary and additional layout and device selection options may be provided. For example, different forms of photo mosaic layouts depicted in FIGS. 2a-2d may be presented for user selection. The user selection of the layout and device are received by the cover photo generation application. In the embodiment illustrated in FIG. 3b, a user has selected photo canvas layout, represented by a check mark in the "Photo canvas" option checkbox, for generating the cover photo. Similar selection indicator(s) may be provided for selecting the device options, as well.

Figure 3B:
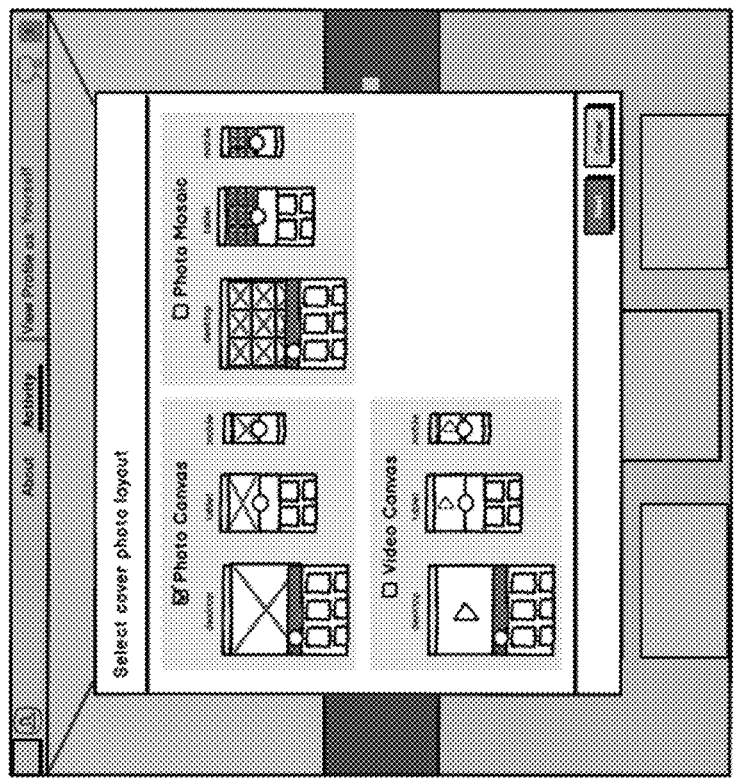
FIGS. 3a-3d illustrate exemplary mock screen shots depicting the process flow sequence of generating a cover photo using photo canvas layout option in the user interface, in one embodiment of the invention.
Figure 3A:
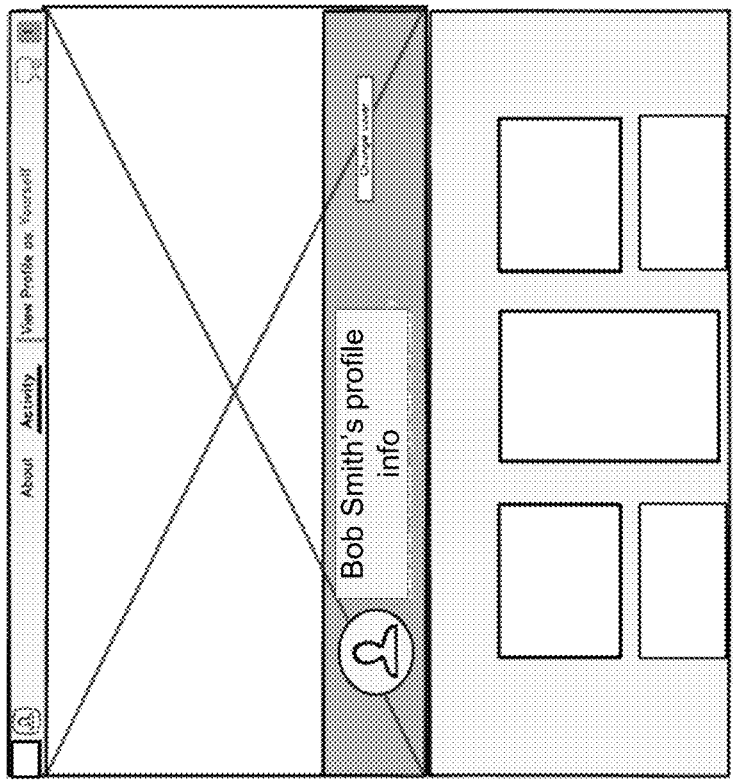
Figure 3D:
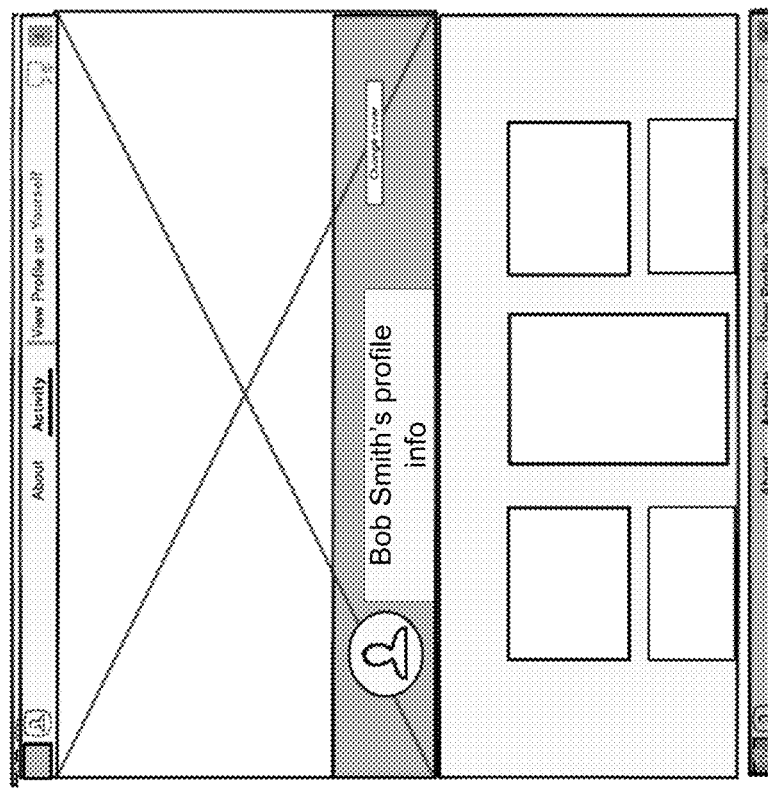
Figure 3C:
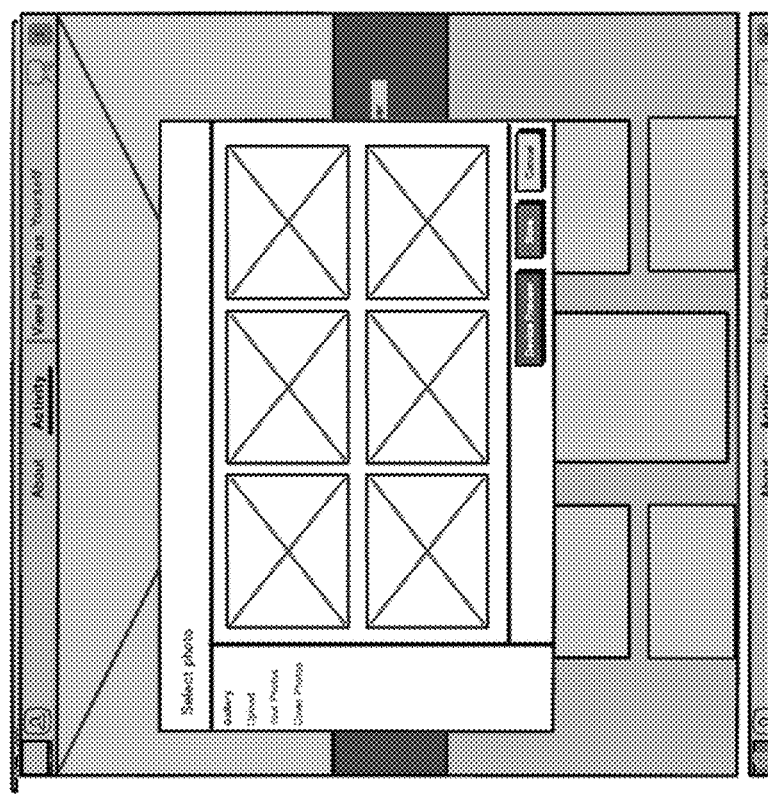

In one embodiment of the invention, in response to user selection of the layout and device, the cover photo generation application renders a user interface for selecting photo(s) to include in the selected layout, as illustrated in FIG. 3c. The user interface provides a user with options to select photos/assets from a photo gallery available within the user account, upload additional photos/assets, select from the user's own photos/assets or select from the user's or other user's cover photos. When the user selects the photo gallery option in the user interface, a plurality of photos are presented for user selection. User selection of a photo is received at the cover photo generation application. In response to receiving the user selection, the selected photo is examined to determine aspect ratio (for e.g., dimensional attributes) of the selected photo, of the slot for inserting the selected photo, and of the photo canvas layout. Based on the examination, the aspect ratio of the selected photo may be adjusted (if needed) to match the slot and photo canvas layout form factor and the cover photo is generated. The cover photo is returned for rendering within the display portion of the profile card of the profile page, as illustrated in FIG. 3d.

Figures 4A, 4B:
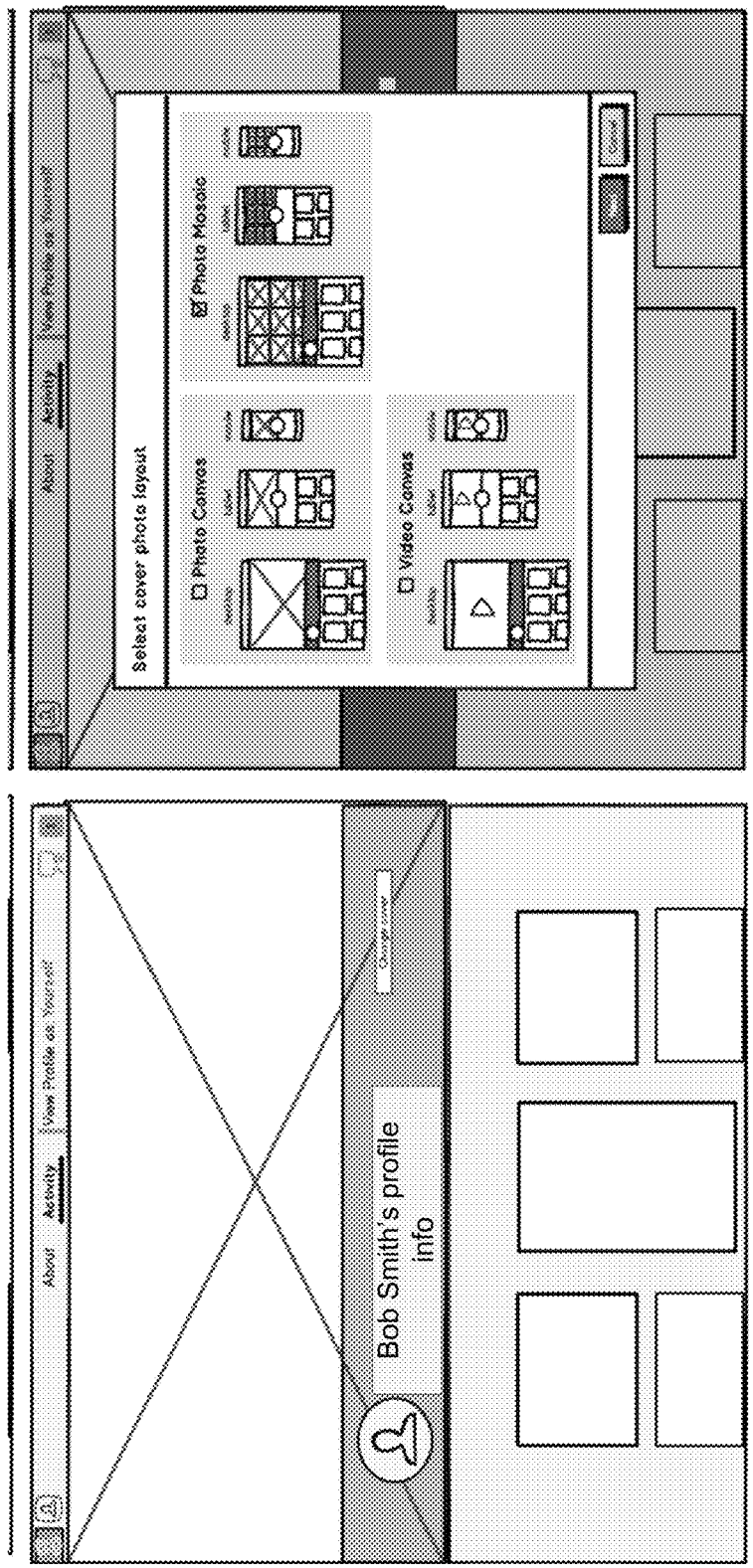
Figure 4D:
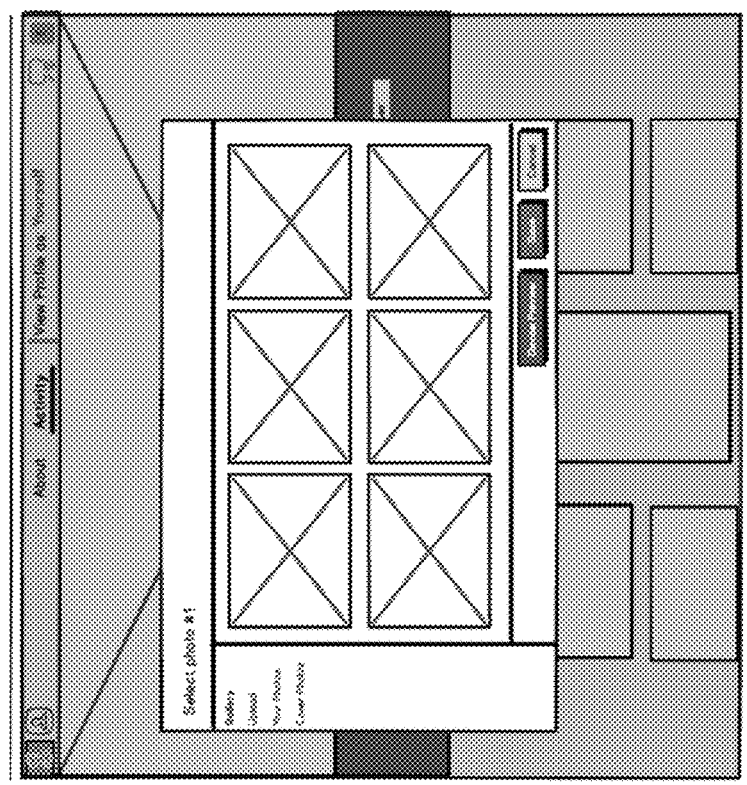
Figure 4C:
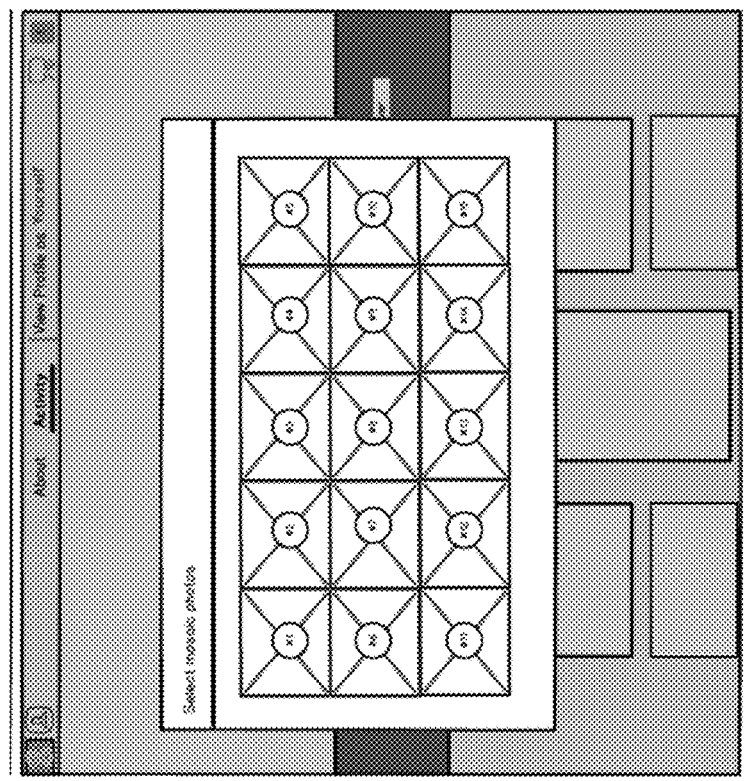

In an alternate embodiment, the user may select mosaic layout option, instead of photo canvas layout, from the option provided by the layout selection mechanism. FIGS. 4a-4e illustrate the exemplary process flow sequence for generating a cover photo using a mosaic layout option. FIGS. 4a and 4b are similar in design and functionality as FIGS. 3a and 3b, wherein a user interface with an option to change an existing photo cover or generate a new photo cover (FIG. 4a) and a user interface for selecting cover photo layout and device (FIG. 4b) are provided. When the mosaic layout option is selected, as represented by check mark in the "Photo Mosaic" option checkbox, a user interface is rendered identifying the various slots available for rendering the photos, as illustrated in FIG. 4c. The layout template for mosaic layout includes a plurality of slots arranged in a single array or multi grid array. Each slot represents a placeholder for inserting the user selected photos. As with photo canvas layout, the application provides a user interface, as illustrated in FIG. 4d, for user selection of photos from a photo gallery available within the user account or photos uploaded from a user. The selected photos are placed in defined slots within the mosaic layout based on sequence of insertion defined by predefined rules, in one embodiment. In an alternate embodiment, the selected photos are placed in specific slots selected by the user. The photos may be adjusted to match the aspect ratio of the slot or to a defined aspect ratio before being placed in the slot. The photos within the mosaic layout are stitched together in the order that is defined by the placement of the photos in the slots and rendered as a unified cover photo in the display portion of the profile card within the profile page, as illustrated in FIG. 4e.

Figure 5B:
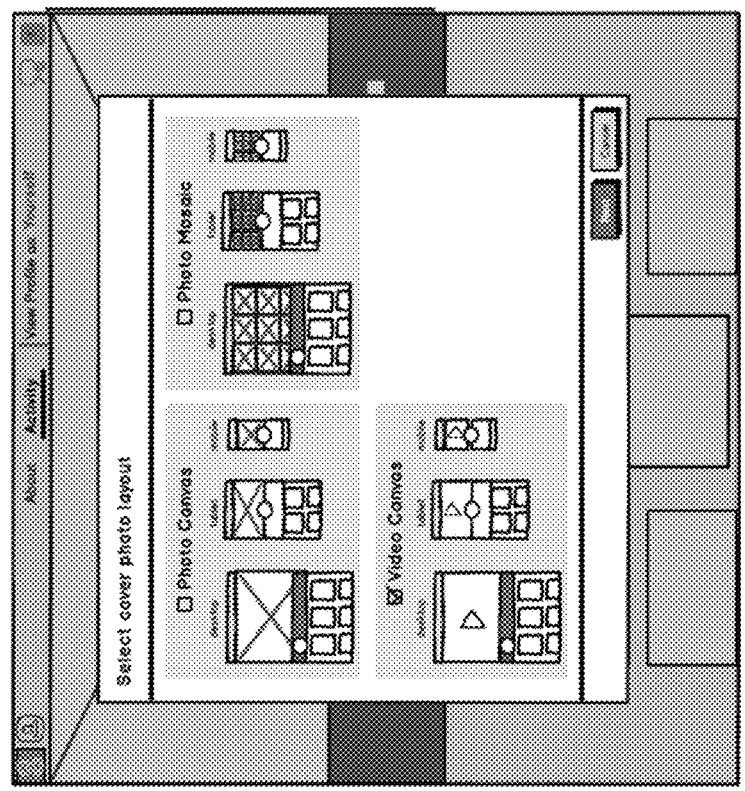
FIGS. 5a-5d illustrate exemplary mock screen shots depicting the process flow sequence of generating a cover photo using video canvas layout option in the user interface, in one embodiment of the invention.
Figure 5A:
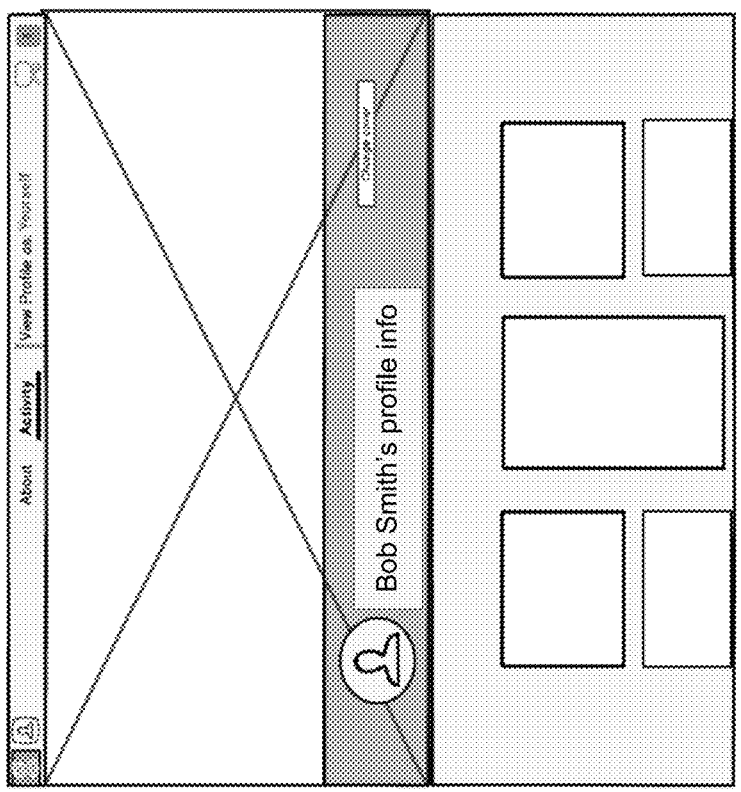
Figure 5C:
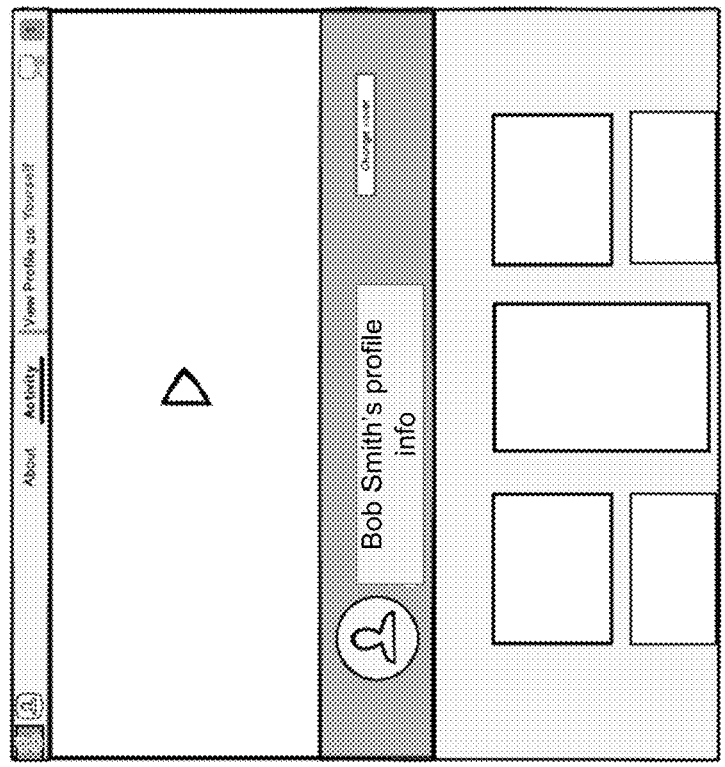
Figure 5D:
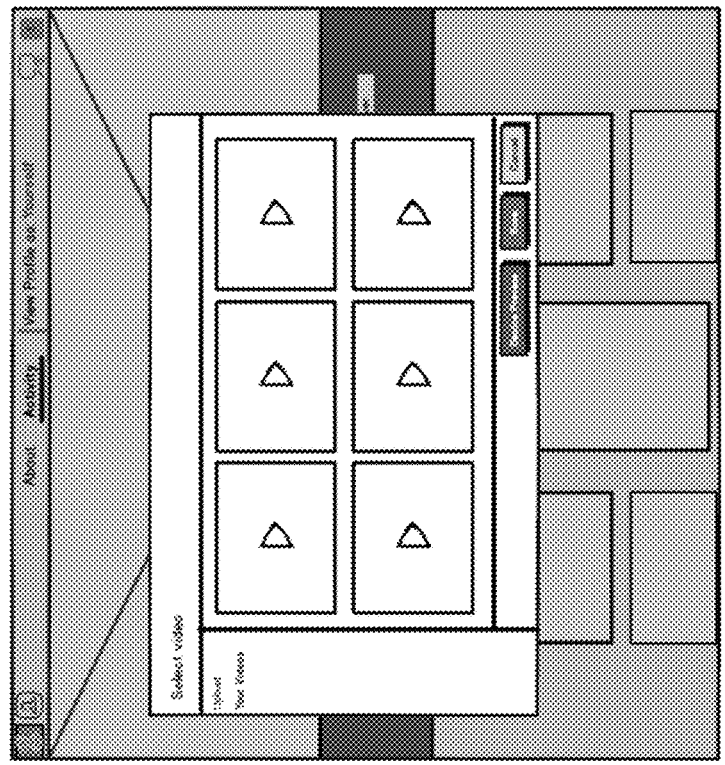

In yet another embodiment, the user may select video canvas layout option, instead of photo canvas or photo mosaic layout, from the options provided by the layout selection mechanism. FIGS. 5a-5d illustrate the exemplary process flow sequence for generating a cover photo using a video canvas layout option. in response to a request to change cover photo received from a user, as illustrated in FIG. 5a, the user may select a video canvas layout, represented by a check mark in the "Video Canvas" layout option checkbox, for generating the cover photo, as illustrated in FIG. 5b, In this embodiment, in response to the video canvas layout selection, a user interface with a plurality of videos (501-506) is presented for user selection, as illustrated in FIG. 5c. The plurality of videos may be provided by the user/other users or may be available within the social network or obtained from the Internet. When a user selects a video from the user interface, the selected video is integrated into the video canvas layout and presented for rendering, as illustrated in FIG. 5d.

Figures 6A, 6B:
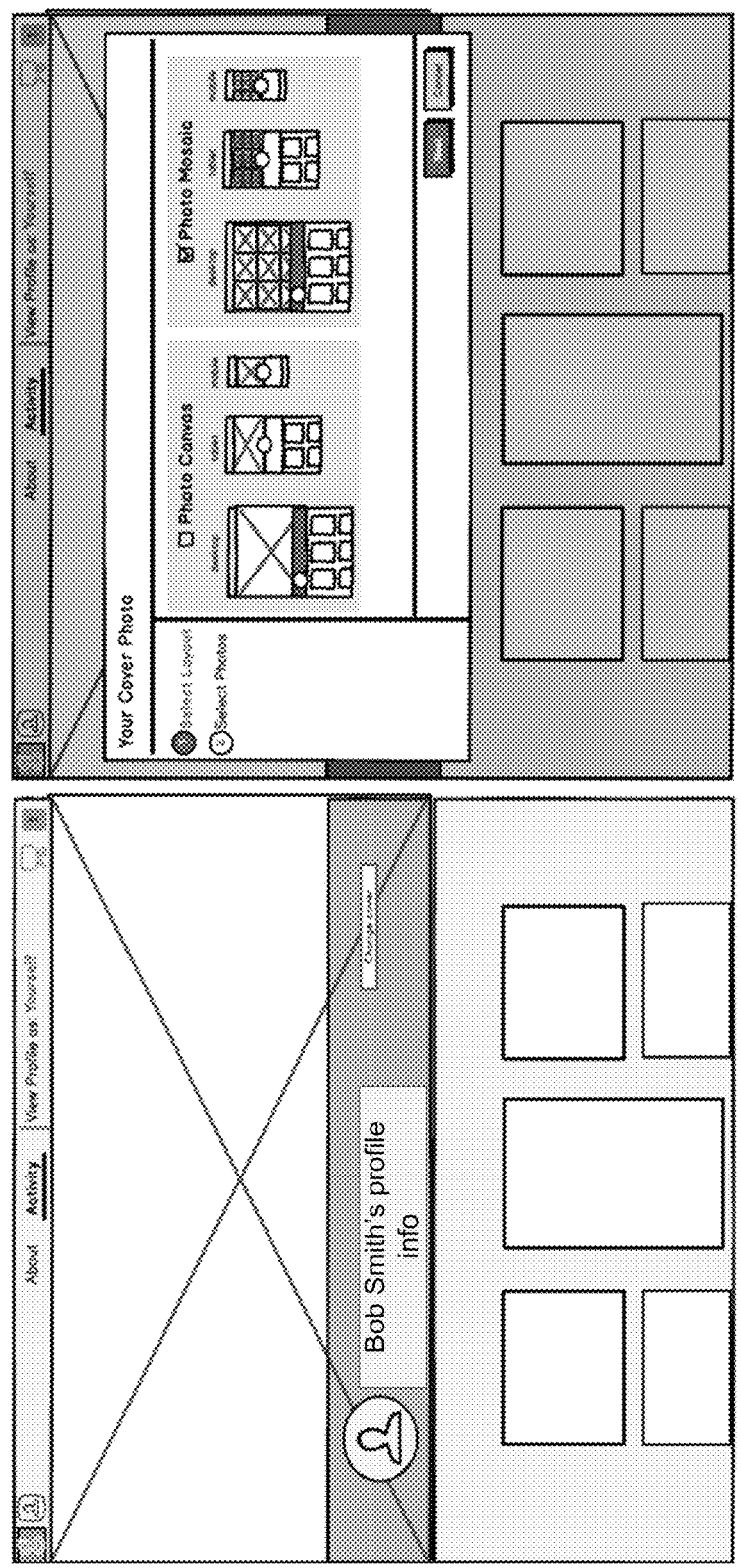
Figure 6C:
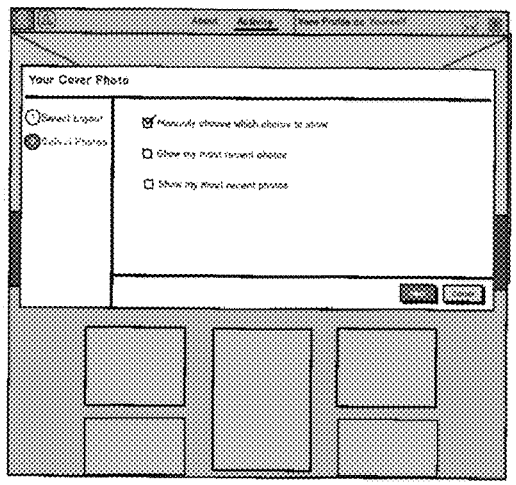

The user interface for selecting photos for the selected layout template include one or more options for selecting the photos. FIGS. 6a-6g illustrate exemplary mock screen shots identifying the process flow sequence of the various options available. FIG. 6a illustrates a user interface with an option to change cover photo. When the change cover photo option is selected in FIG. 6a, the cover photo generation application provides a user with an option to select the layout option and/or option to select device, as illustrated in FIG. 6b. In response to user selection of desired layout and device, the application provides a user interface with a plurality of options for selecting photos for inserting into the desired layout. FIG. 6c illustrates some exemplary options provided for selecting the photos. For example, the user interface may include a manual selection option allowing the user to manually select the photos, or an automatic selection option allowing the application to select photos. The automatic selection option further includes a most recent photo option identifying the most recent photos uploaded to the social network by the user and available in the user account, or a most popular photo option identifying photos that are popular within the social network or within the Internet. Additional options, such as photos for a specific event, specific time frame, etc., may also be provided in addition to the aforementioned options.

Figure 6D:
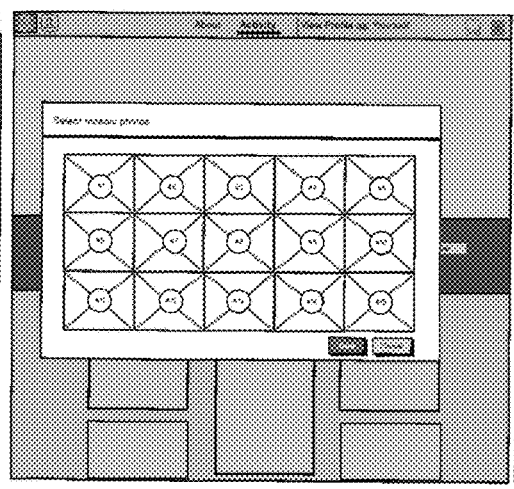
Figure 6E:
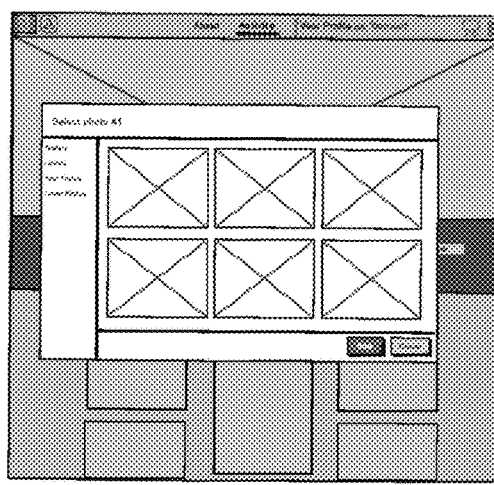
Figure 6F:
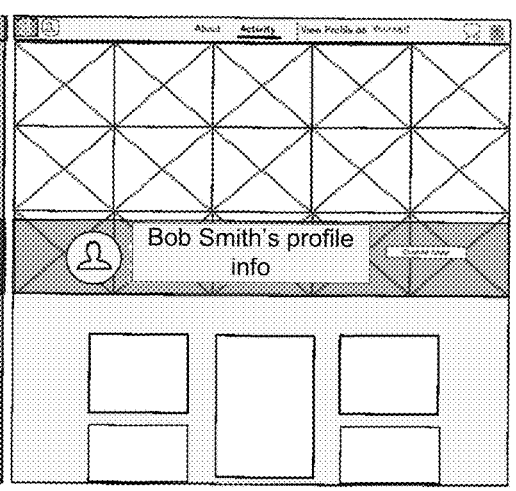

In one embodiment, a manual selection option is selected by the user for selecting photos for the cover photo, as illustrated in FIG. 6c. In response to the manual selection option, the cover photo generation application renders a user interface with the selected layout, as illustrated in FIG. 6d, and allows the user to select photo(s) from within the social network or outside of the social network for inclusion in the cover photo, as illustrated in FIG. 6e. In this embodiment, the selected layout is a mosaic layout. The manual selection option is not restricted to just the mosaic layout but may also be available to photo canvas layout or video canvas layout. When the user has completed selection of the photos for inclusion in the cover photo, the application integrates the selected photos into a unified cover photo and renders the unified cover photo in the profile page, as illustrated in FIG. 6f. In this embodiment, the manual selection option allows selection of the photos and the placement of the photos are based on predefined rules.

In an alternate embodiment, the manual selection option not only allows a user to select the photos but may also allow the user to select placement of the photos in different slots within the selected layout template. In this embodiment, the user may select a photo and select the slot within the template for inserting the selected photo, as illustrated in FIG. 6g. A user activity detector at the slot will detect the user selection and provide the slot selection information to the application for inserting the selected photo. The application may determine the attributes of the selected slot, attributes of the selected photo and re-size the photo to match the attributes of the selected slot. In this embodiment, the user may select photo 1 at time t1 and select to insert the photo 1 into slot 2; select photo 2 at time t2 and select to insert the photo 2 into slot 5; and select photo 3 at time t3 and select to insert the photo 3 into slot 1, and so on. The cover photo is generated by stitching the inserted photos together in the order the photos are presented/inserted within the layout template.

Figure 7B:
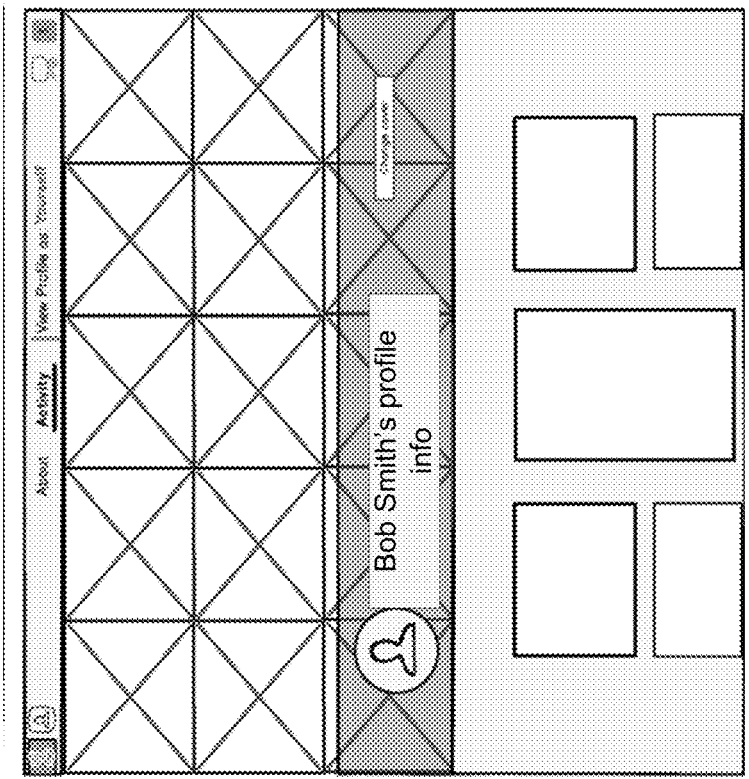
FIGS. 7a-7d illustrate exemplary mock screen shots and block diagrams depicting the process flow sequence of generating a cover photo using automatic selection option within a cover photo generation application, in one embodiment of the invention.
Figure 7A:
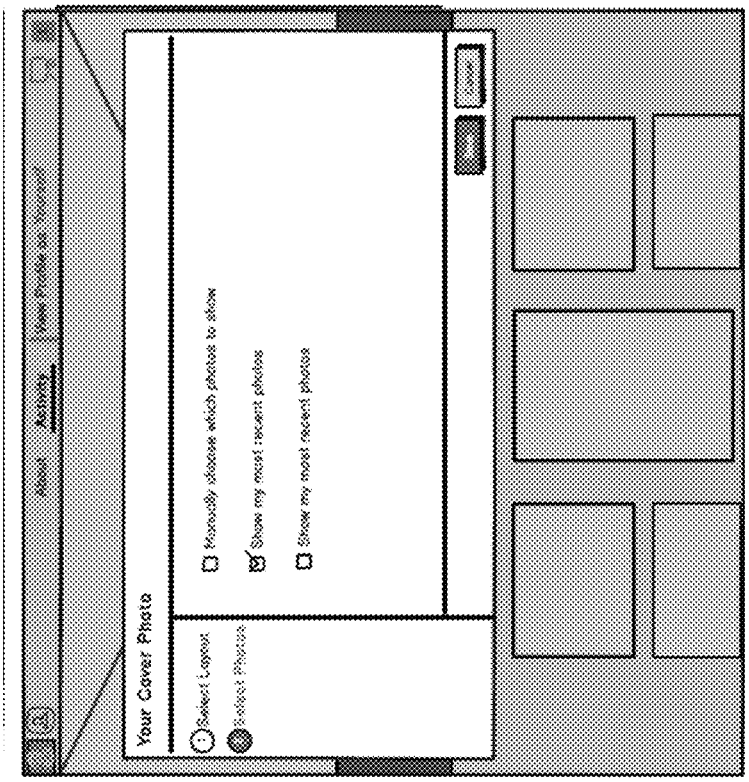

When the most recent photo option or most popular photo option is selected from the user interface, the application, in one embodiment, automatically identifies the photos for the respective category and either arranges the identified photos into different slots within the template based on predefined rules or allow the user to select the slots to insert the selected photos. FIGS. 7a-7d illustrate exemplary mock screen shots and block diagrams defining process flow sequence for generating cover photo using most recent photo option or most popular photo option. As illustrated in FIG. 7a, the user selects "Show my most recent photos" option from the user interface provided by the application in response to selecting a layout template and/or device. The layout template selected, in this embodiment, is a mosaic layout option, as illustrated in FIG. 7b.

Figure 7C:
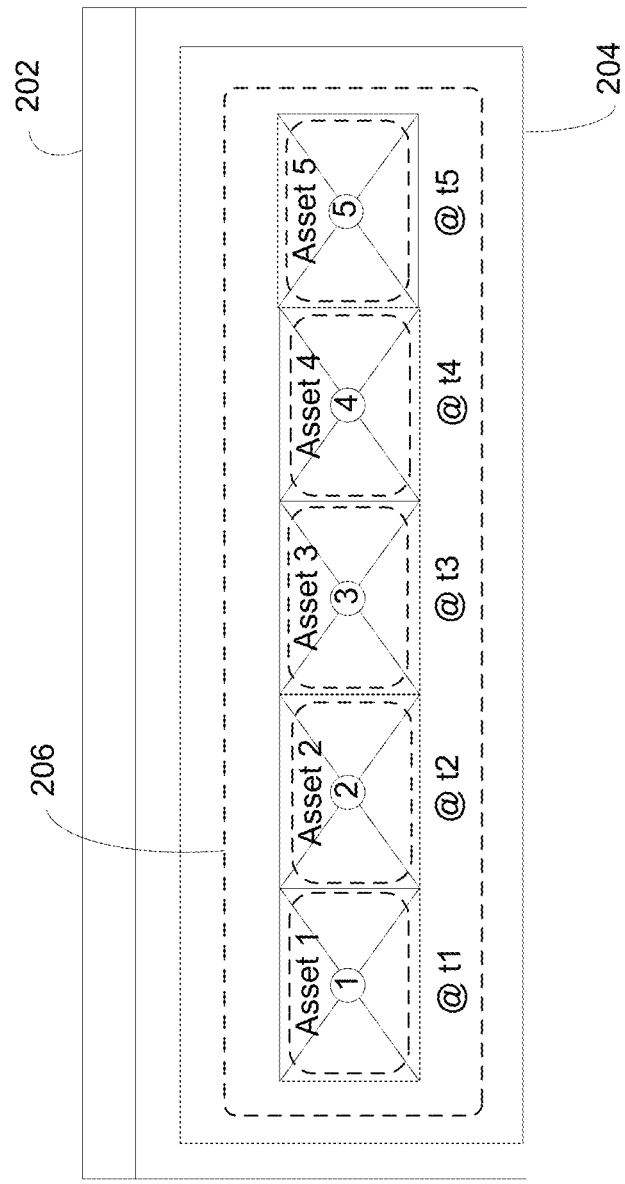
Figure 7D:
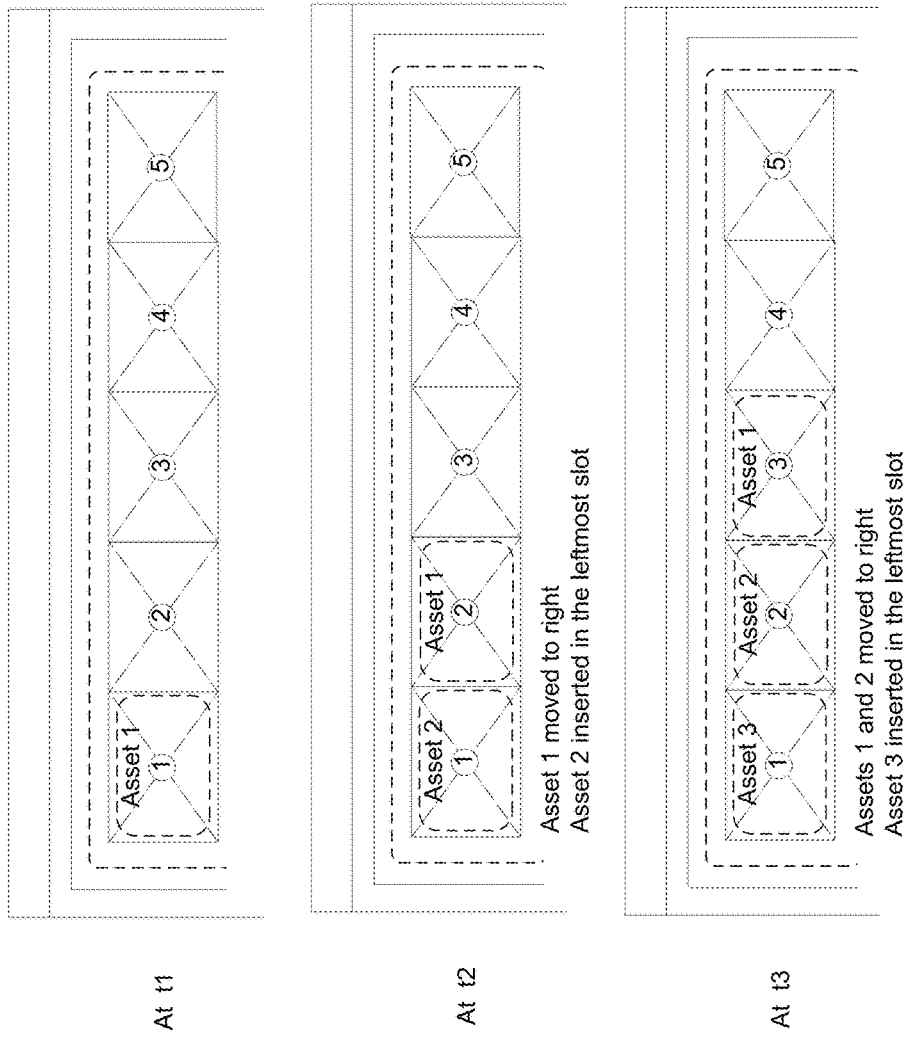

FIGS. 7c and 7d illustrate different embodiments used by the application for automatically inserting the selected pictures/assets into assigned slots based on predefined rules. As illustrated in FIG. 7c, the application inserts photo 1 at time t1 into slot 1, photo 2 at time t2 into slot 2, photo 3 at time t3 into slot 3, and so on. The predefined rules identifies the sequence of insertion for placing the photos/assets. In this embodiment, the predefined rules specifies a temporal order of insertion of the assets in the template. It should be noted, that the placement of the assets in respective slots may include resizing of the assets to fit the aspect ratio of the slot within the selected template, if needed, prior to insertion.

In another embodiment illustrated in FIG. 7d, the cover photo generation application may assign the selected photos in a different sequence from the one illustrated in FIG. 7c. In this embodiment, the application may assign the slots for each of the selected photos in such a way that the assets are organized in a reverse temporal order, with the latest selected photo in the first slot and the oldest selected photo in the last slot. In one embodiment, the application may organize the photos by first inserting the photo into the left most slot (for single array template) or top left most slot (for multi array template) and shifting the photos to the right when additional photos are received for placement. In this embodiment, the application may examine each of the photos, determine the aspect ratio of the photos and adjust the aspect ratio to fit the aspect ratio of each of the slots in the selected layout template before insertion. The cover photo is generated by stitching the inserted photos together in the order the photos are presented/inserted within the layout template. The sequence of insertion described in the two embodiments illustrated in FIGS. 7c and 7d may also be extended for manual selection option when the user is allowed to select the photos manually but not the location where the photos may be placed.

Referring back to FIG. 6c, in one embodiment, in response to the most recent photo option or most popular photo option, the application may identify the most recent photos or most popular photos and present the same for user selection. Based on user selection of the photos, the application may determine the placement of the photos in slots based on sequence selection defined by the predefined rules, as described with reference to FIGS. 7c and 7d, or allow the user to determine the placement of the photos in slots, as described with reference to FIG. 6g above.

The photo generation application examines the selected asset to determine if the dimensions of the pictures match the dimensions defined for the slots in the selected template. If the dimensions of the selected photo or asset matches the dimensions of the selected slot, the application may proceed to insert the selected assets into the identified slots. In one embodiment, based on the examination, if it is determined that the dimensions of the selected assets do not match the dimensions of the selected slots, the application may resize the assets to fit the dimensions of the selected slots and proceed to insert the resized assets into the selected slots. In this embodiment, the examination may entail automatically determining the aspect ratio requirement of the selected slot within the selected template and resizing the pictures/assets to the dimension requirements of the slot depending on the form factor of the slots defined in the template. For example, if the selected template is a single array of 5 tiles/slots with each tile/slot having a 3×4 aspect ratio, then the cover photo generation application may automatically re-size the dimensions of the selected pictures to match the requirements of the slot before inserting the picture into the selected slot. The re-sizing may including cropping the picture to fit the selected slot size. Alternately, the application may request the user to resize the photo to fit the size of the slot within the selected template before the application inserts the selected photo into the slot.

The cover photo generation application continues the process of examining, resizing, and inserting the selected pictures/assets till all the slots are filled or till the user has completed selection of the pictures/assets for the cover photo.

The application generates a unified cover photo by stitching the selected photos together in the order the photos were inserted into the layout or based on predefined rules and returns the unified cover photo for rendering in the profile page, as illustrated in FIG. 6f.

In one embodiment, if the user does not select a photo, a default photo may be presented in the cover photo. In this embodiment, the application may select the photo canvas layout for presenting the default photo. The cover photo generation application obtains profile facts from the user and overlays the profile facts on top of the cover photo. Some exemplary information that can be included in the profile facts include user's name, profile photo, text and icons.

It should be noted that although the various embodiments have been described with reference to photos, the logic of the application can be extended to include other types of media, such as videos, animations, photospheres, etc. In one embodiment, the logic for stitching the photos together to generate a unified cover photo may be based on content and attributes of the selected photos. In this embodiment, irrespective of the sequence of insertion, the application may stitch the photos in accordance to asset options selected, such as based on most popular photos, most recent photos, most relevant photos, based on content, etc. In one embodiment, the user may select the logic to use for stitching the various photos to generate the unified cover photo.

In another embodiment, when the selected template includes slots that are of varied sizes, the examination may entail automatically assigning the picture/asset to a specific slot whose dimensions closely match the dimension of the selected picture/asset and seeking user input for accepting the automatic placement and/or for selecting alternate slot for placing the selected picture/asset.

In one embodiment, the predefined rules may be defined based on examination of the content of the individual pictures/assets, e.g., colot content, whether people or objects are contained in the photo, temporal parameters associated with the pictures/assets, commentary about the pictures/assets by friends/social contacts, posting of pictures by third parties.

If the number of photos selected by the user for inclusion in the cover photo is less than the number of slots available in the selected layout, the fewer number of photos will be stitched together to define a condensed cover photo. The condensed cover photo may be scaled to be responsive to the dimension of the display area within the profile card or to the display area of the selected device. For example, if the template selected for the cover photo includes a single array of 5 slots and the user has selected 3 photos for inclusion in the cover photo, the application will scale the cover photo to be responsive to the display area of the profile card so that the cover photo renders in the center of the profile card.

Figure 8A:
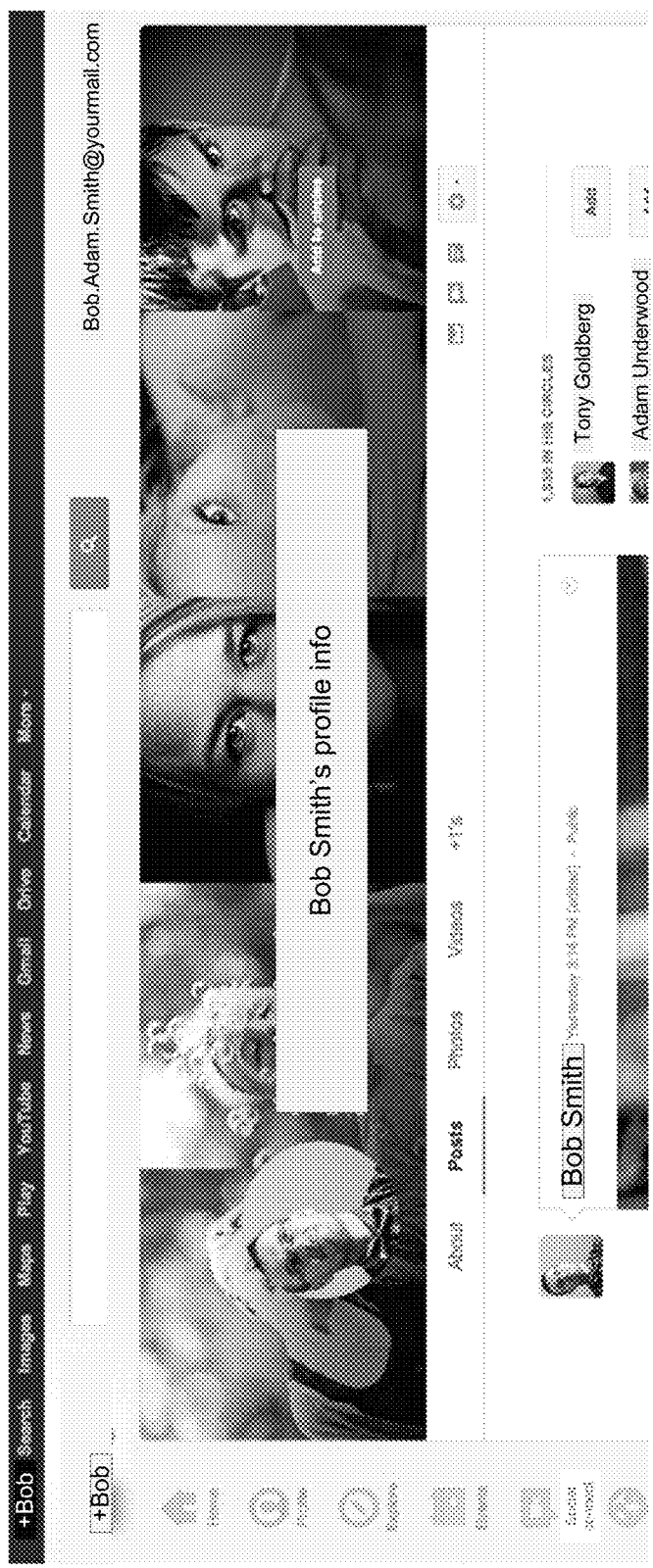
Figure 8B:
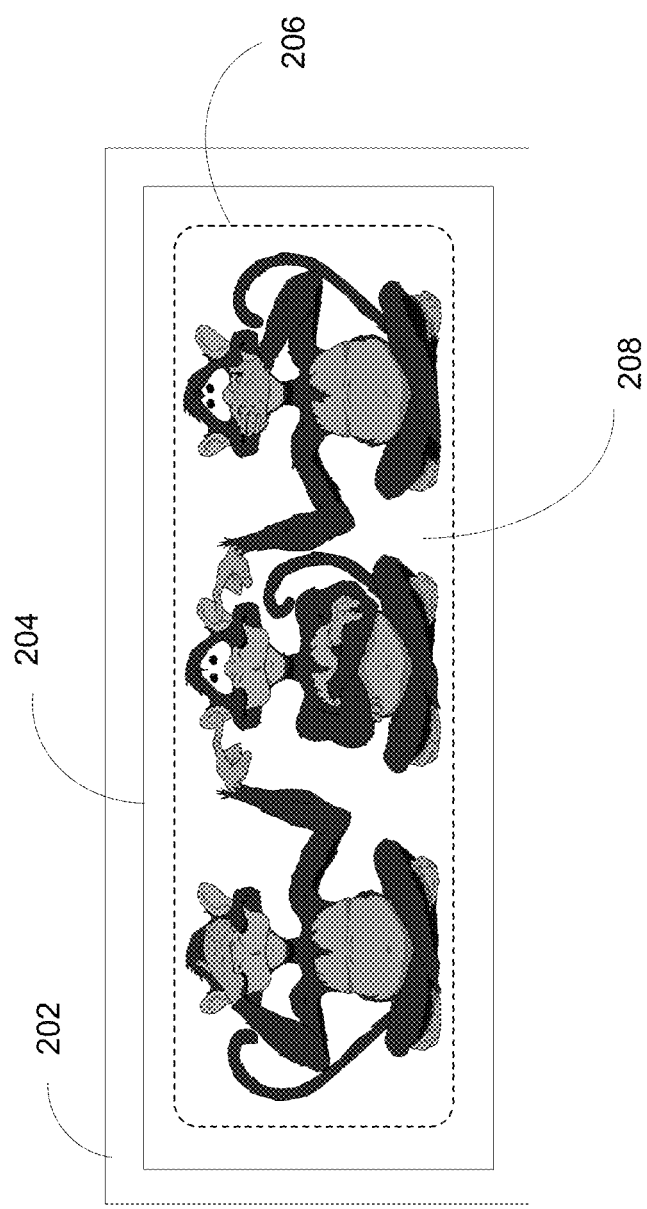
Figures 1, 8C:
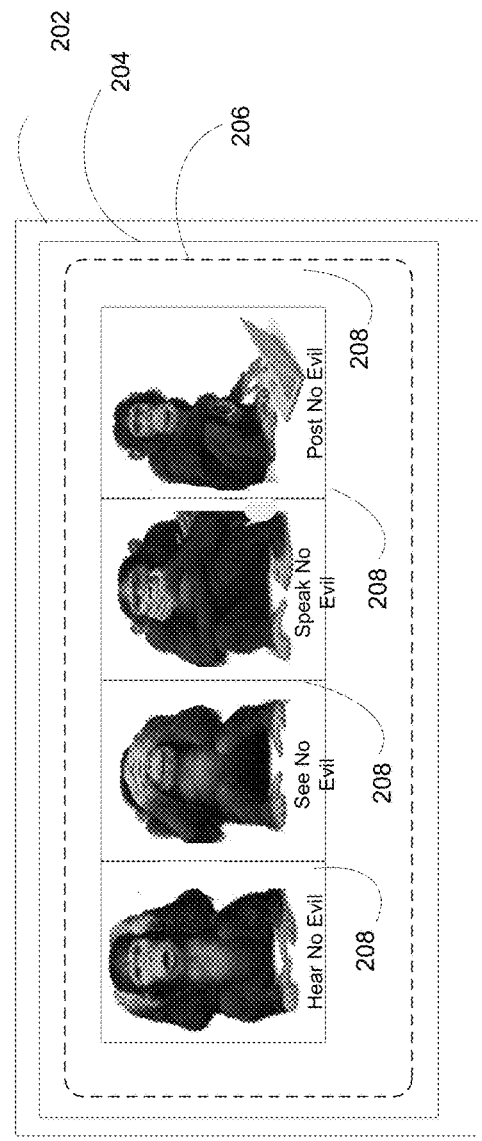
Figures 2, 8C:
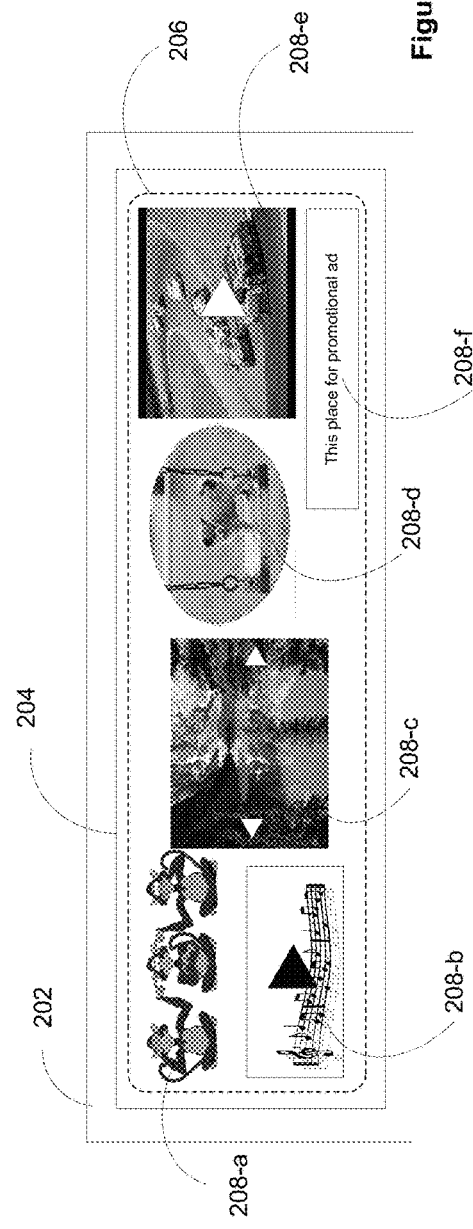

The scaling of the cover photo to be responsive to the dimension of the display area within the profile card of the profile page will be described with reference to FIGS. 8a-8c. FIG. 8a illustrates a cover photo template that includes a a single array of 5 slots with each slot being filled by a user selected photo, for example. The application integrates the selected assets to generate a mosaic with the sequence of the selected photos based on the sequence defined by the user or by the predefined rules. FIG. 8b illustrates a cover photo wherein only one photo 208 has been selected by the user. The application adjusts the display area of the cover photo to render the selected photo in the center of the profile card. FIGS. 8c-1 and 8c-2 illustrate embodiments where more than one media is selected for inclusion in the cover photo or cover media. As illustrated in FIG. 8c-1, 4 graphic pictures 208 were selected for inclusion in the cover photo. The cover photo generation application stitches the 4 pictures together in the sequence defined by the predefined rules and/or by the user and scales the cover photo to render in the center of the profile card. It should be noted that the aforementioned embodiments have been discussed with reference to photos, but the logic of the embodiments can be extended to any other type of asset. FIG. 8c-2, various media assets are selected for inclusion in the cover media. As illustrated, the media assets may include animation graphic 208-a, audio media 208-b, photo sphere 208-c that provides a 360° view of the media, typically a photo or scene, a picture 208-d, a video media 208-e and a slot for placing a promotional media 208-f. Of course, the illustrated media are exemplary and should not be considered limiting. Other media may also be included in the generation of the cover photo/cover media. It should also be noted that the various embodiments described with reference to FIGS. 8a-8c are exemplary and that the same logic can be extended to any other template configuration. The placement of the cover photo to the center of the profile card is exemplary and should not be considered restrictive. As a result, other placement locations may also be entertained.

When user has initially selected fewer photos than the number of slots, the application generates a condensed cover photo with the selected photos and rescales the condensed cover photo to be responsive to the dimensions of the profile card. After the generation of the condensed cover photo, the user may add additional photos. The additional photos may be stitched together with the photos that make up the cover photo to make a larger unified cover photo. When additional photos are added, the application may dynamically rescale the cover photo to map the larger unified cover photo to the display area of the profile card. In one embodiment, the rescaling may entail resizing the initial set of photos, as well as the newly added photos, if need be.

In one embodiment, the application allows customizing an existing cover photo. In this embodiment, one or more photos within the unified cover photo may be replaced with other photos. This functionality allows updating and/or customization of select ones of the photos from time to time. The profile card may also be customized using one or more background images that may be provided at the profile page for user selection. The background images may relate to a specific theme defined by the selected photos, specific theme defined by a user or may be generic.

Figure 2C:
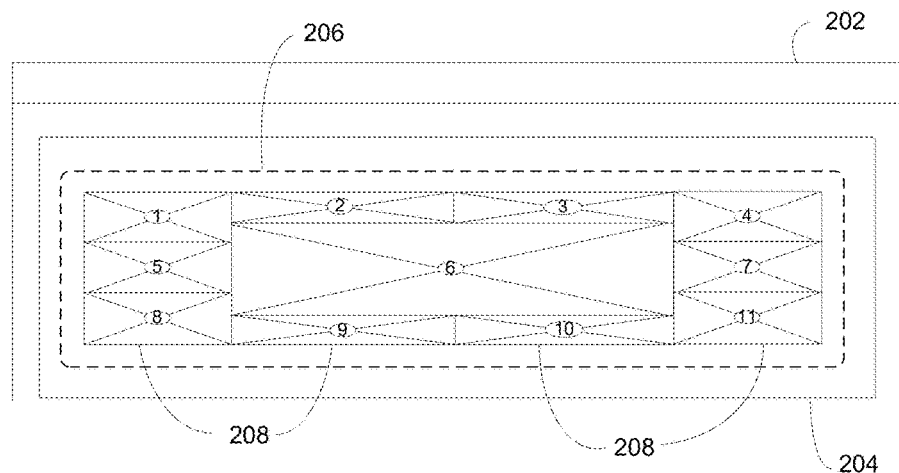
Figure 2D:
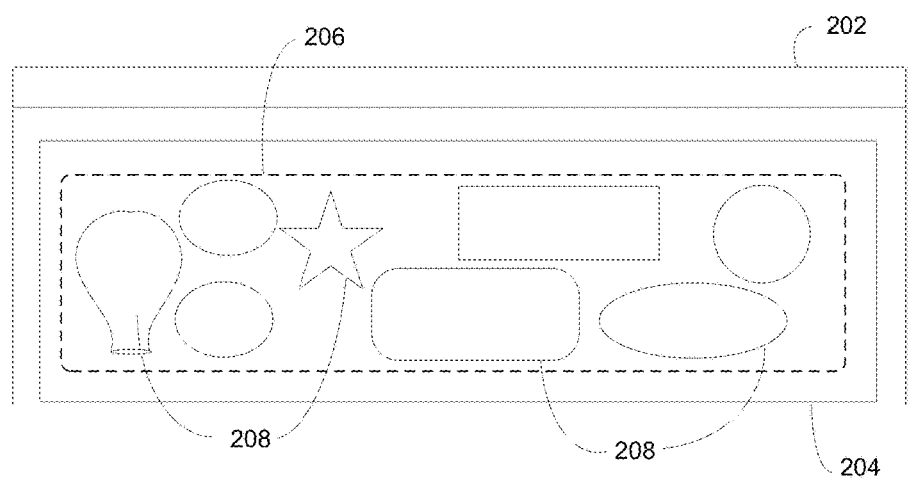

If the selected template is a two-dimensional array having multiple columns and rows illustrated in FIG. 2b or 2c or a randomized bubble template illustrated in FIG. 2d, the photo generation application may use the selected ones of the pictures and/or other assets identified by the user to generate a mosaic representing a unified cover photo and when the number of pictures/assets selected for the cover photo is fewer than the available slots, rescale the mosaic to render the filled slots symmetrically in the profile card on the profile page.

In one embodiment, when the photos and/or assets presented in the cover photo are of varied sizes, the cover photo generation application may stitch the different sized photos and/or assets together into a mosaic if the template permits different sized photos/assets or re-size and then stitch the resized photos/assets together to form the mosaic (i.e., collage format) for the cover photo. The photos or assets for the cover photo may include photos or assets of the user or provided by the user for whom the cover photo for the profile page is being generated, and/or photos or assets of other users/entities socially connected to the user or obtained from the Internet, including videos, pictures, photospheres, advertisements, graphic animations, promotional media content, any other asset that can be rendered on the cover photo or combinations thereof. The photosphere, in one example, may provide views that are extended beyond a two-dimensional view (e.g., 360° view, based on capture of spaces made by special capturing devices). The photosphere may be provided by the user or a social contact of the user or by a third party. The cover photo is, therefore, a customizable region of the user profile that can be generated with information obtained from user input and can be updated periodically by the user. The generated cover photo includes custom features that are integrated and stitched with existing pictures/assets to provide a single unified photo.

In one embodiment, once the cover photo is generated and rendered on the profile page, the cover photo generation application may provide an option to switch one photo/asset with another photo/asset. The switching is not restricted to switching specific ones of the asset with like kind of asset. Rather, a photo may be switched with a video or any other type of asset and vice versa. The cover photo generation module also provides an option to re-arrange the pictures or assets within the cover photo, add or delete pictures and/or assets from the cover photo, and resize one or more pictures/assets. The re-arrangement or resizing of the assets may result in a change in the template used for presenting the cover photo. During re-arrangement or resizing, the application may determine that the new arrangement/resizing corresponds to a different template than the one selected for presenting the cover photo and automatically switch the template, in one embodiment, to enable the desired cover photo to be generated.

In one embodiment, the pictures and/or assets identified and provided by the user may be reorganized by the cover photo generation application based on content. In this embodiment, the organization of the pictures/assets in the cover photo may be performed by the system based on some criteria, such as preferred pictures/assets defined by user selection sequence, popularity of the asset/pictures amongst the social contacts of the user, popularity of the pictures/assets across the Internet, most recent asset/pictures, monetary benefits associated with the pictures/assets, etc. This above list of criteria is exemplary and should not be considered restrictive. Fewer or additional criteria may be used during the generation of the cover photo.

In one embodiment, the cover photo may be edited to replace specific ones of the pictures/assets with different pictures/assets based on temporal parameters. For example, the editing of the cover photo may include adding newer pictures/assets or rearranging the existing ones of the pictures/assets. In this example, as newer pictures/assets are identified by the user, the older pictures in the cover photo are replaced with the newer ones. In this example, the temporal attributes of the different pictures within the cover photo are used to determine which ones of the older pictures are to be replaced by the newer pictures. Upon insertion of the newer pictures/assets into the slots occupied by the older pictures/assets, the pictures/assets in the slots may be reorganized based on a temporal sequence or based on predefined rules.

In one embodiment, in addition to generating the cover photo, the generation module may also provide the ability to overlay the user's profile information. The profile data may include textual content, icons, images, etc., representing the user's profile. In this embodiment, the profile image may be selected by the user and may include the user's picture, user's avatar, or any other image identified and provided by the user.

The various embodiments described herein enable a user to select more than one picture/asset to showcase in the cover photo, and also provide greater flexibility in customizing the cover photo by allowing the user to determine how the pictures/assets are to be rendered (single array vs a grid vs a random shape mosaic, etc.), which pictures/assets are to be rendered, where each of the selected pictures/assets are to be rendered in the cover photo, etc. The cover photo also provides the user with the ability to allow advertisements or other promotional media/asset to be rendered on the cover photo. The cover photo is fully responsive to the the profile card dimensions such that the cover photo dimensions are dynamically adjusted to fit the profile card dimensions.

Figure 9:
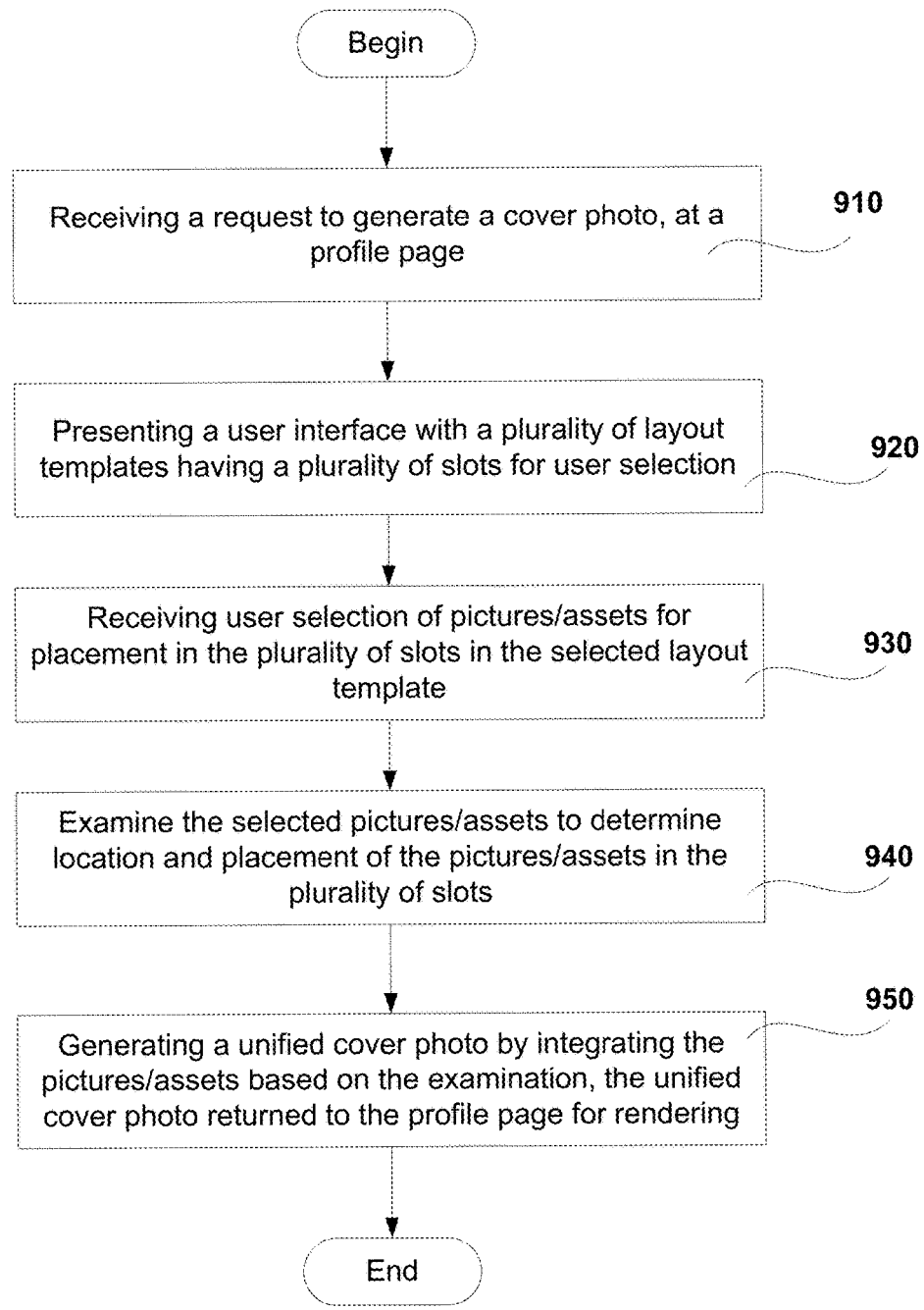
FIG. 9 illustrates method operations used for generating customized cover photo for a profile page of a social network for rendering on a social display device, in accordance with an embodiment of the invention.

With the above general understanding of generating a cover photo from user provided profile pictures, a method for generating the cover photo will now be described with reference to FIG. 9. The method begins in operation 910, when a request to generate a cover photo is received from a user. The user may access the profile page within the social network to initiate the request. In response to the request, a cover photo generation application may present a user interface with a plurality of layout templates identifying one or more slots for placing user selected pictures/assets, as illustrated in operation 920. The plurality of slots represent place holder for inserting one or more photos/assets selected by the user for inclusion in the cover photo. User selection of the layout template is detected at the user interface.

Once a layout template has been selected, a second user interface with a plurality of asset selection options is provided. The asset selection options allow a user to select the type of assets for placing in the selected template. User selection of the type of asset is detected, and in response, a list of appropriate pictures/assets matching the selected asset type is presented in the user interface for user selection, as illustrated in operation 930. In response to the user selection of the picture/asset, the cover photo generation application may examine the picture/asset to determine placement and location of the selected picture/assets in the plurality of slots provided in the user interface. The examination may include determining the specific slot into which the selected picture/asset is to be placed and the dimensional requirements for the specific slot, as illustrated in operation 940. In one embodiment, the determination of the slot may be based on predefined rules. The predefined rules may define the temporal sequence in which the open slots in the template are to be filled. The cover photo generation application may examine the selected picture/asset to determine if the dimensional attributes of the selected picture/asset matches the specific slot's dimensions. If the selected picture/asset's dimensional attributes match the specific slot's dimension, the application may insert the selected picture/asset into the specific slot. If, on the other hand, the picture/asset's dimensions do not match the specific slot's dimensions, the application may resize the dimensions of the picture/asset and then insert the resized picture/asset into the specific slot.

In one embodiment, the user selection at the template may include selection of a particular slot for placing the selected picture/asset. In this embodiment, the cover photo generation application examines the selected slot's dimensions and compares it against the dimensions of the selected picture/asset, resizes the selected picture/asset, if needed, and inserts the selected picture/asset into the selected slot.

The process of receiving the pictures/assets, examining, resizing (if needed) and placing them in open slots continue one picture/asset at a time in the sequence established by the predefined rules till all the open slots are filled or till the user has no more pictures/assets to place. After all the slots have been filled or after the user has completed selection of assets/pictures, the photo generation application will integrate the pictures/assets provided in the slots together in a sequence defined by the pictures in the slots to generate a unified cover photo, as illustrated in operation 950. The unified cover photo may be resized to match the dimensions of the profile card. The unified cover photo is returned for rendering in a profile card of the profile page of the social network. The rendered cover photo may be updated from time to time by adding, deleting, rearranging, switching the one or more pictures/assets, and/or reorganizing the pictures based on content or sequence defined by predefined rules, to generate a customized cover photo that reflects the user's up-to-date profile.

The cover photo returned for rendering in the profile card of the profile page also includes user profile information in the form of text, icon, image, etc. The user profile data may be overlaid on a section of the cover photo. The cover photo generation application provides the user with a more robust and extensive profile customization tool. By allowing a cover photo to be generated with a mixture of media assets, the user is able to showcase his interests and preferences in rich, meaningful and concise way.

Figure 10:
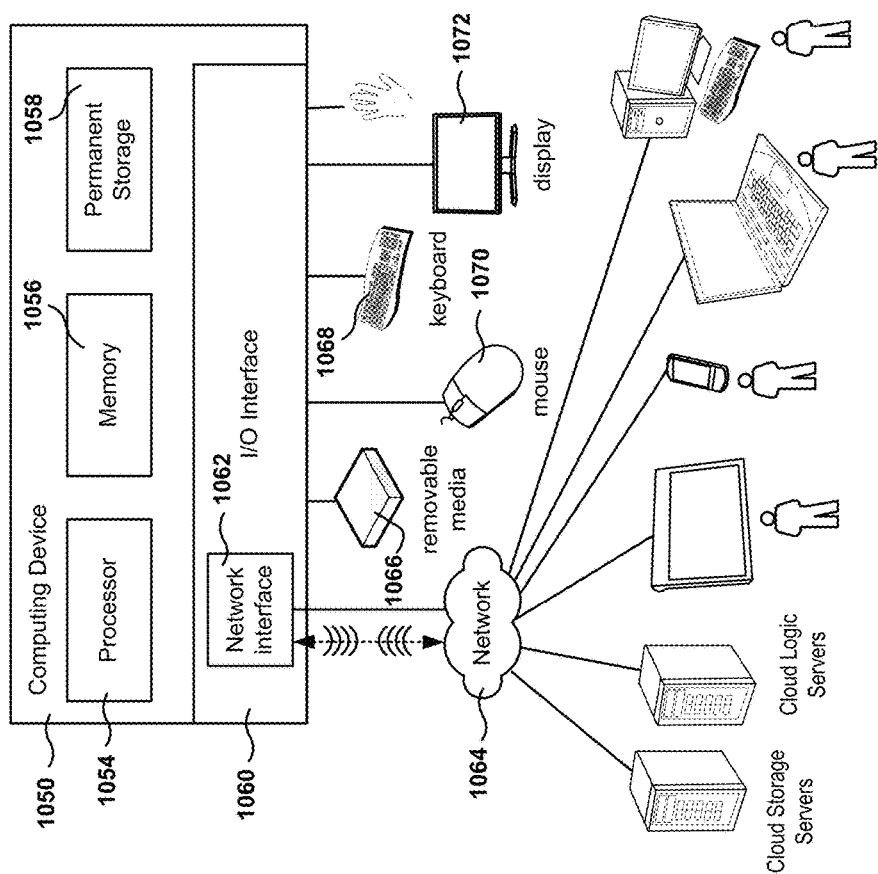
FIG. 10 illustrates a basic infrastructure of a computing device used in generating cover photo, in one embodiment of the invention.

FIG. 10 is a simplified schematic diagram of a computer system for implementing embodiments of the present disclosure. It should be appreciated that the methods described herein may be performed with a digital processing system, which in one embodiment may be a conventional, general-purpose computer system. Special purpose computers, which are designed or programmed to perform only one function, may be used in the alternative. The computing device 1050 includes a processor 1054, which is coupled through a bus to memory 1056, permanent storage 1058, and Input/Output (I/O) interface 1060.

Permanent storage 1058 represents a persistent data storage device, e.g., a hard drive or a USB drive, which may be local or remote. Network interface 1062 provides connections via network 1064, allowing communications (wired or wireless) with other devices. It should be appreciated that processor 1054 may be embodied in a general-purpose processor, a special purpose processor, or a specially programmed logic device. Input/Output (I/O) interface 1060 provides communication with different peripherals and is connected with processor 1054, memory 1056, and permanent storage 1058, through the bus. Sample peripherals include display 1072, keyboard 1068, mouse 1070, removable media device 1066, etc.

Display 1072 is configured to display the user interfaces described herein. Keyboard 1068, mouse 1070, removable media device 1066, and other peripherals are coupled to I/O interface 1060 in order to exchange information with processor 1054. It should be appreciated that data to and from external devices may be communicated through I/O interface 1060. Embodiments of the disclosure can also be practiced in distributed computing environments where tasks are performed by remote processing devices that are linked through a wired or a wireless network.

Embodiments of the present disclosure can be fabricated as computer readable code on a non-transitory computer readable storage medium. The non-transitory computer readable storage medium holds data which can be read by a computer system. Examples of the non-transitory computer readable storage medium include permanent storage 1058, network attached storage (NAS), read-only memory or random-access memory in memory module 1056, Compact Discs (CD), Blu-ray™ discs, flash drives, hard drives, magnetic tapes, and other data storage devices. The non-transitory computer readable storage medium may be distributed over a network-coupled computer system so that the computer readable code is stored and executed in a distributed fashion.

Some, or all operations of the method presented herein are executed through a processor. Additionally, although the method operations were described in a specific order, it should be understood that some operations may be performed in a different order, when the order of the operations do not affect the expected results. In addition, other operations may be included in the methods presented, and the operations may be performed by different entities in a distributed fashion, as long as the processing of the operations is performed in the desired way.

In addition, at least one operation of some methods performs physical manipulation of physical quantities, and some of the operations described herein are useful machine operations. Embodiments presented herein recite a device or apparatus. The apparatus may be specially constructed for the required purpose or may be a general purpose computer. The apparatus includes a processor capable of executing the program instructions of the computer programs presented herein.

Further shown are a plurality of other devices, storage, and services that may be connected to network 1064. Network 1064 can be, for example, the Internet. The Internet is interconnected with a plurality of devices, including cloud storage servers, cloud logic servers, user interface devices, etc. Some devices that can communicate with the Internet access services on various cloud logic servers and cloud storage can include, e.g., tablet computers, smart phones, laptops, desktop computers, television systems, and the like. The devices that can communicate with each other require at least a processor, and a display for presenting user interface views from selected programs and code that render the user interfaces. The user interface can be provided through keyboard entry, text entry, voice entry, gesture entry, and combinations thereof.

The user interfaces can be presented in browsers of the various devices, can interpret HTML code, can render video, can communicate over the Internet by way of wireless communication, can render Flash video data, and the like. All of these devices, hardware embodiments, and code are configured for enabling the interfacing and interaction with the social network, and the users of the social network, and users on various websites connected to the Internet. The interaction, through social networks will enable electronic messaging regarding current information, shared interests, chat communication, video communication, and general posting, interests, and relationship management. Broadly speaking, a social network is a site that allows at least two people or entities to communicate with one another and share at least one piece of data.

Although the foregoing embodiments have been described with a certain level of detail for purposes of clarity, it is noted that certain changes and modifications can be practiced within the scope of the appended claims. Accordingly, the provided embodiments are to be considered illustrative and not restrictive, not limited by the details presented herein, and may be modified within the scope and equivalents of the disclosure.

What is claimed is:

1. A method, comprising:
   receiving, by a processor, a request to generate a cover photo for presentation in a profile page user interface associated with a user account on a social network, wherein the profile page user interface comprises a predetermined area for the presentation of the cover photo;
   responsive to the request, causing a presentation of a user interface defining a plurality of slots for inserting assets into the cover photo;
   receiving a selection of the assets for placement in the plurality of slots presented by the user interface, wherein each of the selected assets is received for placement in a different one of the plurality of slots, wherein the selected assets for the cover photo comprise at least two different asset types selected from a textual asset type, an image asset type, a video asset type, or an audio asset type;
   responsive to receiving the selection of the assets for placement in the plurality of slots, placing the selected assets in the plurality of slots in view of predefined rules; and
   generating the cover photo by stitching together the selected assets; and
   responsive to a number of selected assets being less than a number of the plurality of slots, scaling the cover photo comprising the stitched assets in view of the predetermined area of the profile page user interface for the presentation of the cover photo.

2. The method of claim 1, wherein the user interface provides a plurality of templates identifying the plurality of slots for inserting the assets into the cover photo, wherein the plurality of slots are associated with attributes used for placing the selected assets in the plurality of slots.

3. The method of claim 2, wherein the attributes comprise at least one of dimensional attributes, placement attributes, or content attributes.

4. The method of claim 1, wherein the plurality of slots varies in dimension and shape.

5. The method of claim 1, wherein placing the selected assets in the plurality of slots in view of the predefined rules comprises placing the selected assets in view of a temporal order of receiving the selection of the assets.

6. The method of claim 1, wherein placing the selected assets in view of the predefined rules further comprises identifying a slot of the plurality of slots capable of receiving a content type and context type of an asset of the selected assets.

7. The method of claim 1, wherein generating the cover photo by stitching together the selected assets further comprises:
   determining dimensional attributes of each the selected assets; and
   resizing one or more of the selected asset to fit dimensional attributes of the plurality of slots in which the selected assets are placed.

8. The method of claim 7, wherein generating the cover photo by stitching together the selected assets further comprises:
   blending a first edge of a first asset of the selected assets with a second edge of a second asset of the selected assets, wherein the first asset and the second asset are placed adjacent to one another.

9. The method of claim 1, wherein placing the selected assets in view of the predefined rules further comprises:

determining slots of the plurality of slots that are available for insertion of the selected assets; and inserting the selected assets in the available slots in view of a reverse temporal order of receiving the selection of the assets.

10. The method of claim 1, wherein scaling the cover photo comprises scaling the stitched assets to be presented in a center of the predetermined area of the profile page user interface for the presentation of the cover photo.

11. The method of claim 1 further comprising:
rendering the profile page user interface to display the cover photo;
detecting user activity at an asset of the cover photo, the user activity to customize the cover photo; and
generating a customized cover photo in view of the user activity, wherein the customized cover photo replaces the cover photo initially rendered in the profile page user interface.

12. The method of claim 11, wherein the user activity to customize the cover photo comprises one of replacing, adding, deleting, resizing, or reordering an asset within the cover photo.

13. A non-transitory computer readable medium comprising instructions that, responsive to execution by a processor, cause the processor to perform operations comprising:
receiving, by the processor, a request to generate a cover photo for presentation in a profile page user interface associated with a user account, wherein the profile page user interface comprises a predetermined area for the presentation of the cover photo;
responsive to the request, cause a presentation of a user interface defining a plurality of slots for inserting assets into the cover photo;
receiving a selection of the assets for placement in the plurality of slots presented by the user interface, wherein each of the selected assets is received for placement in a different one of the plurality of slots, wherein the selected assets for the cover photo comprise at least two different asset types selected from a textual asset type, an image asset type, a video asset type, or an audio asset type;
responsive to receiving the selection of the assets for placement in the plurality of slots, placing the selected assets in the plurality of slots in view of predefined rules; and
generating the cover photo by stitching together the selected assets; and
responsive to a number of selected assets being less than a number of the plurality of slots, scaling the cover photo comprising the stitched assets in view of the predetermined area of the profile page user interface for the presentation of the cover photo.

14. The non-transitory computer readable medium of claim 13, wherein the user interface provides a plurality of templates identifying the plurality of slots for inserting the assets into the cover photo, wherein the plurality of slots are associated with attributes used to determine the placement of the selected assets in the plurality of slots.

15. The non-transitory computer readable medium of claim 13, wherein the plurality of slots varies in dimension and shape.

16. The non-transitory computer readable medium of claim 13, wherein placing the selected assets in view of the predefined rules comprises identifying a slot of the plurality of slots capable of receiving a content type and context type of an asset of the selected assets.

17. A system comprising:
a memory; and
a processor, coupled to the memory, to:
receive a request to generate a cover photo for presentation in a profile page user interface associated with a user account, wherein the profile page user interface comprises a predetermined area for the presentation of the cover photo;
in response to the request, cause a presentation of a user interface defining a plurality of slots for inserting assets into the cover photo;
receive a selection of the assets for placement in the plurality of slots presented by the user interface, wherein each of the selected assets is received for placement in a different one of the plurality of slots, wherein the selected assets for the cover photo comprise at least two different asset types selected from a textual asset type, an image asset type, a video asset type, or an audio asset type;
responsive to receiving the selection of the assets for placement in the plurality of slots, place the selected assets in the plurality of slots in view of predefined rules; and
generate the cover photo for presentation by stitching together the selected assets; and
responsive to a number of selected assets being less than a number of the plurality of slots, scale the cover photo comprising the stitched assets in view of the predetermined area of the profile page user interface for the presentation of the cover photo.

18. The system of claim 17, wherein the user interface to provide a plurality of templates to identify the plurality of slots for inserting the assets into the cover photo, wherein the plurality of slots are associated with attributes used to determine the placement of the selected assets in the plurality of slots.

19. The system of claim 17, wherein the plurality of slots varies in dimension and shape.

20. The system of claim 17, wherein to place the selected assets in the plurality of slots in view of predefined rules, the processor further to identify a slot of the plurality of slots capable of receiving a content type and context type of an asset of the selected assets.

21. The method of claim 1, wherein placing the selected assets in the plurality of slots in view of predefined rules comprises placing the selected assets in the plurality of slots in view of content of the selected assets.

22. The non-transitory computer readable medium of claim 13, wherein placing the selected assets in the plurality of slots in view of predefined rules comprises placing the selected assets in the plurality of slots in view of content of the selected assets, a temporal order of receiving the selection of the assets, a reverse temporal order of receiving the selection of the assets, or dimensions of the selected assets.

23. The system of claim 17, wherein to place the selected assets in the plurality of slots in view of predefined rules, the processor further to place the selected assets in the plurality of slots in view of content of the selected assets, a temporal order of receiving the selection of the assets, a reverse temporal order of receiving the selection of the assets, or dimensions of the selected assets.

* * * * *